(12) United States Patent
Shichiken et al.

(10) Patent No.: US 9,931,907 B2
(45) Date of Patent: Apr. 3, 2018

(54) VEHICLE AIR-CONDITIONING UNIT

(71) Applicant: Valeo Japan Co., Ltd., Kumagaya-shi (JP)

(72) Inventors: Yutaka Shichiken, Kumagaya (JP); Daisuke Araki, Kumagaya (JP); Takao Koike, Kumagaya (JP)

(73) Assignee: VALEO JAPAN CO. LTD., Kumagaya-Shi (JP)

( * ) Notice: Subject to any disclaimer, the term of this patent is extended or adjusted under 35 U.S.C. 154(b) by 468 days.

(21) Appl. No.: 14/418,522

(22) PCT Filed: Apr. 24, 2013

(86) PCT No.: PCT/JP2013/061971
§ 371 (c)(1),
(2) Date: Jan. 30, 2015

(87) PCT Pub. No.: WO2014/020957
PCT Pub. Date: Feb. 6, 2014

(65) Prior Publication Data
US 2015/0306935 A1    Oct. 29, 2015

(30) Foreign Application Priority Data

Aug. 2, 2012   (JP) ................. 2012-171644

(51) Int. Cl.
*B60H 1/00*   (2006.01)
*F25D 21/00*   (2006.01)

(52) U.S. Cl.
CPC ....... *B60H 1/00564* (2013.01); *B60H 1/0005* (2013.01); *B60H 1/00678* (2013.01); *B60H 1/00685* (2013.01); *F25D 21/002* (2013.01)

(58) Field of Classification Search
CPC . F25D 21/002; B60H 1/00564; B60H 1/0005; B60H 1/00678; B60H 1/00685
(Continued)

(56) References Cited

U.S. PATENT DOCUMENTS 7,857,041 B2   12/2010   Fukagawa et al.
2003/0192334 A1   10/2003   Kawauchi et al.

FOREIGN PATENT DOCUMENTS

JP   H 09-202126 A   8/1997
JP   2001-191782 A   7/2001
(Continued)

OTHER PUBLICATIONS

English translation of Fukagawa (JP 2007 230373).*
(Continued)

*Primary Examiner* — Jianying Atkisson
*Assistant Examiner* — Joel Attey
(74) *Attorney, Agent, or Firm* — Howard & Howard Attorneys PLLC

(57) ABSTRACT

To provide a vehicle air-conditioning unit that increases a volume of airflow delivered from a side vent opening in a foot mode, to effectively prevent fogging of windowpanes on right and left end sides. An air passage has: a first passage that guides hot air to a center vent opening, a side vent opening, and a defrost opening; and a second passage that is branched from the first passage and guides the hot air to a foot opening. A first door is arranged at a branched position of the air passage to the second passage, and a second door is arranged between the center vent opening and the defrost opening. In a foot mode, the first door closes the first passage and opens a first supply passage, the first supply passage communicates between the first and second passages, the second door closes the center vent opening and forms a second supply passage on an upstream side of the side vent opening, and the second supply passage communicates between an extending direction of the first supply passage and the side vent opening.

14 Claims, 22 Drawing Sheets

(58) Field of Classification Search
USPC .......................................................... 165/47
See application file for complete search history.

(56) References Cited

FOREIGN PATENT DOCUMENTS

| | | |
|---|---|---|
| JP | 2003-306026 A | 10/2003 |
| JP | 2006-088784 A | 4/2006 |
| JP | 2007-230373 A | 9/2007 |

OTHER PUBLICATIONS

International Search Report for Application No. PCT/JP2013/061971 dated Aug. 6, 2013, 5 pages.
English language abstract and machine-assisted English translation for JPH 09-202126 extracted from the PAJ database on Mar. 2, 2015, 18 pages.
English language abstract and machine-assisted English translation for JP 2001-191782 extracted from the PAJ database on Mar. 2, 2015, 24 pages.
English language abstract for JP 2003-306026 extracted from the PAJ database on Mar. 2, 2015, 1 page.
English language abstract and machine-assisted English translation for JP 2006-088784 extracted from the PAJ database on Mar. 2, 2015, 24 pages.
English language abstract for JP 2007-230373 extracted from espacenet.com database on Mar. 2, 2015, 2 pages.

* cited by examiner

DEF/FOOT MODE

B/L MODE

VENT MODE

Fig.10
(a)
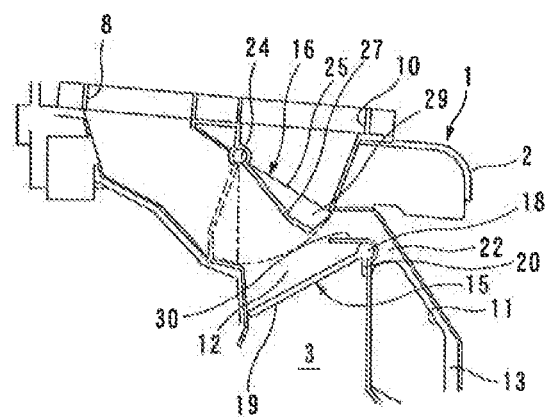
(b)
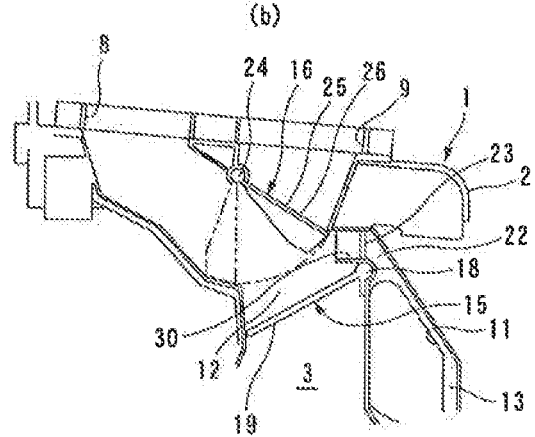

DEF/FOOT MODE

B/L MODE

VENT MODE

FOOT MODE

Fig.21 DEFROST MODE

DEF/FOOT MODE

B/L MODE

VENT MODE

VEHICLE AIR-CONDITIONING UNIT

CROSS-REFERENCE TO RELATED APPLICATIONS

This application is the National Stage of International Patent Application No. PCT/JP2013/061971, filed on Apr. 24, 2013, which claims priority to and all the advantages of Japanese Patent Application No. 2012-171644, filed on Aug. 2, 2012, the content of which is incorporated herein by reference.

TECHNICAL FIELD

The present invention relates to an air-conditioning unit that is installed in a vehicle and includes a heat exchanger as well as a defrost opening, a center vent opening, a side vent opening, and a foot opening that are arranged on a downstream side of this heat exchanger, the heat exchanger being arranged in an air passage that is formed in an air-conditioning case.

BACKGROUND ART

A vehicle air-conditioning system disclosed in PTL 1 is configured that it is arranged in the front in a vehicle traveling direction, that an air blower, an evaporator, a heater core are housed in an air passage formed in an air-conditioning case, that an air mix door is provided to adjust a mixture ratio of the air that passes through the heater core and the air that bypasses the heater core, and that a defrost opening, a center vent opening, a side vent blowout opening, and a foot blowout opening are provided on a downstream side of this air mix door.

Then, in a foot mode, hot air flows out of a foot opening, the hot air is blown out of the defrost opening through a defrost port, and the hot air is blown out of a side vent opening through a side vent blowout port. Accordingly, fogging of windowpanes in the front and on right and left end sides in a vehicle cabin of a vehicle is prevented.

In addition, a vehicle air-conditioning system disclosed as another example in PTL 1 is configured by having: a def/vent mode door for switching between the center vent opening and the defrost opening; and a vent mode door for opening and closing the center vent opening.

CITATION LIST

Patent Literature

PTL 1: JP-A-2006-88784

SUMMARY OF INVENTION

Technical Problem

In the vehicle air-conditioning system as that disclosed in PTL 1, in the foot mode, prevention of fogging of the front windowpane in the vehicle traveling direction is prioritized over that of the windowpanes on the right and left end sides in the vehicle cabin. In view of this, it is set such that a volume of airflow delivered from the defrost blowout port is larger than a volume of airflow delivered from the side vent blowout port. Since the airflow only needs to be blown out of the side vent blowout port through the side vent opening, the volume of such airflow is not particularly adjusted.

However, there has been an increasing demand for reliably preventing fogging of the windowpanes on the right and left sides in the vehicle cabin of the vehicle by increasing the volume of the air that is delivered from the side vent blowout port to be larger than a conventional volume. There is even a case where a vehicle air-conditioning system is desired that can increase the volume of the airflow delivered from the side vent blowout port to be larger than the volume of the airflow delivered from the defrost blowout port.

Accordingly, it is considered to increase the volume of the air that is blown out of the side vent blowout port by increasing a ventilating cross section from the side vent opening to the side vent blowout port in the air-conditioning unit to be larger than a conventional cross section. However, a distance of a duct from the opening to the blowout port is generally shorter in the defrost side than that in the side vent side in the air-conditioning unit. In addition, a ventilating cross section of the duct is generally larger in the defrost side than that in the side vent side. Thus, it is difficult to satisfy a requirement for increasing the volume of the airflow delivered from the side vent blowout port to be larger than the volume of the airflow delivered from the defrost blowout port by simply increasing the ventilating cross section from the side vent opening to the side vent blowout port of the air-conditioning unit to be larger than the conventional ventilating cross section.

Meanwhile, in recent years, weight reduction of the vehicle air-conditioning system has been demanded for purposes of downsizing of a vehicle, improvement of fuel economy, and the like.

In view of the above, an object of the invention is to provide a vehicle air-conditioning unit, a weight of which is reduced to be compact, and that increases a volume of airflow delivered from a side vent opening to be larger than a volume of airflow delivered from a defrost opening in a foot mode, so as to effectively prevent fogging of windowpanes on right and left end sides in a vehicle cabin.

Solution to Problem

A vehicle air-conditioning unit according to this invention includes: an air-conditioning case that has an air passage therein; a heat exchanger that is arranged in the air passage and exchanges heat with air flowing through the air passage; a center vent opening that is provided on a downstream side of the heat exchanger arranged in the air-conditioning case; a side vent opening that is provided on a right side and/or a left side in a vehicle right and left direction of the center vent opening; a defrost opening that is provided in a front side in a vehicle longitudinal direction of the center vent opening; and a foot opening that is provided on a lower side in a vehicle vertical direction of the center vent opening. The air passage has: a first passage that guides air that has passed through the heat exchanger to the center vent opening, the side vent opening, and the defrost opening; and a second passage that is branched from the first passage and guides the air that has passed through the heat exchanger to the foot opening. A first door for distributing the air that has passed through the heat exchanger to the first passage and the second passage is arranged at a branched position to the second passage. A first supply passage that communicates between the first passage and the second passage is provided on a downstream side of the first door, and this first supply passage is opened and closed by the first door. A second door for distributing the air that has passed through the heat exchanger to the center vent opening and the defrost opening is arranged in the first passage at a position on a downstream side of the first supply passage. In the vehicle air-conditioning unit, in a foot mode, the first door closes the first passage and opens the first supply passage, and the second door closes the center vent opening, and forms a second supply passage, an entry of which is positioned in an extending direction of the first supply passage and an exit of which communicates with the side vent opening (claim 1). Here, the center vent opening and the side vent opening may be adjacent to each other in an order of the side vent opening, the center vent opening, and the side vent opening, or may be adjacent to each other in an order of the center vent opening, the side vent opening, and the center vent opening. The foot opening may function as a foot blowout port that is opened to the inside of the vehicle cabin as is, or may be connected to the foot blowout port via a duct. The heat exchanger may be a heat exchanger for heating or a heat exchanger for cooling except for a case where it is identified below as the heat exchanger for heating.

In this way, the second door integrates a door for opening and closing the defrost opening and a door for opening and closing the vent opening. Thus, the number of door parts is reduced, and a weight of the vehicle air-conditioning unit is relatively reduced.

In addition, in the foot mode, since the first door closes the first passage, the air that passes through the heat exchanger is distributed to the second passage. Then, since the first supply passage is opened, some of the air that has been distributed to the second passage can flow to the first passage through the first supply passage.

Furthermore, in the foot mode, since the second door closes the center vent opening, the air that has flown to the first passage through the first supply passage is prevented from flowing to a center vent blowout port through the center vent opening. Then, when the second door closes the center vent opening, the defrost opening is opened. Thus, the air that has flown to the first passage through the first supply passage can flow to a defrost blowout port through the defrost opening.

At this time, the second door forms the second supply passage, the entry of which is positioned in the extending direction of the first supply passage, and the exit of which communicates with the side vent opening. Thus, most of the air that has flown to the first passage through the first supply passage can flow to a side vent blowout port through the side vent opening.

More specifically, the first door is a butterfly-type door that has: a rotational shaft that is rotatably supported by the air-conditioning case; a first closing section that extends from the rotational shaft; and a second closing section that extends from the rotational shaft in a different direction from the first closing section. In the foot mode, it may be configured that the first closing section closes the first passage and that the second closing section opens the first supply passage (claim 2).

It is characterized that the first door further has a third closing section extending from the rotational shaft in a different direction from both of the first closing section and the second closing section, that a length of the third closing section in a direction along a shaft direction of the rotational shaft is shorter than a length of the first supply passage in the direction along the shaft direction of the rotational shaft, and that, in the foot mode, the third closing section partially closes the first supply passage (claim 3). In this way, in the foot mode, since the third closing section partially closes the first supply passage, an exit of the first supply passage can easily be formed at an arbitrary position. Thus, freedom in design can be improved.

Meanwhile, it may be characterized that the first door is a rotary-type door having: a rotational shaft that is rotatably supported by the air-conditioning case; a first closing section that extends from the rotational shaft; a second closing section that extends from the rotational shaft in a different direction from the first closing section; an outer peripheral wall surface that connects the first closing section and the second closing section in an arcuate shape; and a recessed section that is formed by notching a portion of the second closing section and a portion of the outer peripheral wall surface. It may also be characterized that, in the foot mode, the first closing section and the second closing section close the first passage and that the recessed section is positioned in the first supply passage (claim 4). In this way, in the foot mode, the first closing section and the second closing section close the first passage, and the recessed section is positioned in the first supply passage. Thus, even when the first passage is closed, some of the air that has been distributed to the second passage can flow to the first passage through the recessed section that is positioned in the first supply passage.

Here, it is characterized that, in a defrost mode or a vent mode, the first door closes the second passage and also closes the first supply passage (claim 7). In this way, in the defrost mode or the vent mode, since the first door closes the second passage, the air that has passed through the heat exchanger is distributed to the first passage. In addition, since the first door closes the first supply passage, the air that has been distributed to the first passage can be prevented from flowing to the second passage through the first supply passage, and the air can reliably be prevented from flowing to the foot blowout port through the foot opening.

In detail, it is characterized that the first door is the butterfly-type door and that the first closing section closes the second passage, and the second closing section closes the first supply passage in the defrost mode or the vent mode. In this way, in the defrost mode or the vent mode, since the first closing section closes the second passage, the air that has passed through the heat exchanger is distributed to the first passage. Furthermore, in this defrost mode or vent mode, since the second closing section closes the first supply passage, the air that has been distributed to the first passage can be prevented from flowing to the second passage through the first supply passage, and the air can reliably be prevented from flowing to the foot blowout port through the foot opening.

In addition, it is characterized that the first door is the rotary-type door and that the first closing section and the second closing section close the second passage, and the first closing section closes the first supply passage in the defrost mode or the vent mode (claim 9). In this way, in the defrost mode or the vent mode, since the first closing section and the second closing section close the second passage, the air that has passed through the heat exchanger is distributed to the first passage. In addition, since the first closing section closes the first supply passage, the air that has been distributed to the first passage can be prevented from flowing to the second passage through the first supply passage, and the air can reliably be prevented from flowing to the foot blowout port through the foot opening.

It is characterized that the second door is a door that has: a rotational shaft that is rotatably supported by the air-conditioning case; and a fourth closing section that extends from the rotational shaft, that the fourth closing section includes: a center vent closing portion that can close the center vent opening; and a step portion that has a step displaced in a peripheral direction of the rotational shaft with respect to the center vent closing portion, that the center vent closing portion closes the center vent opening, and the step portion is positioned on an upstream side of the side vent opening and forms the second supply passage in the foot mode (claim 5). In this way, the fourth closing section includes the center vent closing portion and the step portion. In a case where an opening end on the second door side of the center vent opening and an opening end on the second door side of the side vent opening are positioned on the same flat plane, in the foot mode, that is, when the center vent closing portion closes the center vent opening, the step portion is positioned on the upstream side of the side vent opening, thus does not close the side vent opening, and forms the second supply passage. Therefore, most of the air that is blown out of the first supply passage can be guided to the side vent opening.

Meanwhile, it may be characterized that the second door is a door that has: the rotational shaft that is rotatably supported by the air-conditioning case; and the fourth closing section that extends from the rotational shaft, that the side vent opening is arranged further on a downstream side of the center vent opening arranged on the downstream side of the heat exchanger, and that the fourth closing section closes the center vent opening, is arranged on the upstream side of the side vent opening, and forms the second supply passage in the foot mode (claim 6). In this way, the side vent opening is arranged further on the downstream side of the center vent opening arranged on the downstream side of the heat exchanger. Thus, in the foot mode, that is, even when the fourth closing section closes the center vent opening, the fourth closing section is positioned on an upstream side of the side vent opening, thus does not close the side vent opening, and forms the second supply passage. Therefore, most of the air that is blown out of the first supply passage can be guided to the side vent opening.

Here, it may be characterized that the second door is a door that has the fourth closing section including the center vent closing portion and the step portion, and that, in a defrost mode or a def/foot mode, the center vent closing portion closes the center vent opening, and the step portion is arranged on the upstream side of the side vent opening and forms the second supply passage, and that, in a vent mode or a bi-level mode, the fourth closing section closes the defrost opening (claim 10). In this way, the fourth closing section of the second door includes the center vent closing portion and the step portion. In the case where the opening end on the second door side of the center vent opening and the opening end on the second door side of the side vent opening are positioned on the same flat plane, in the defrost or def/foot mode, that is, when the center vent closing portion closes the center vent opening, the step portion is at a position separated from the side vent opening, thus does not close the side vent opening, and can easily form the second supply passage. Therefore, since the air that has flown to the first passage can flow to the side vent blowout port through the side vent opening, fogging of windowpanes in the front and right and left end sides in a vehicle cabin can effectively be prevented.

In addition, it may be characterized that the second door is a door that has the fourth closing section, that the side vent opening is arranged further on the downstream side of the center vent opening arranged on the downstream side of the heat exchanger, that, the fourth closing section closes the center vent opening, is positioned on the upstream side of the side vent opening, and forms the second supply passage in the defrost mode or the def/foot mode, and that the fourth closing section closes the defrost opening in the vent mode or the bi-level mode (claim 11). In this way, the side vent opening is arranged further on the downstream side of the center vent opening arranged on the downstream side of the heat exchanger. Thus, in the defrost mode or the def/foot mode, that is, when the fourth closing section closes the center vent opening, the fourth closing section does not close the side vent opening, and can easily form the second supply passage. Therefore, since the air that has flown to the first passage can flow to the side vent blowout port via the side vent opening, fogging of the windowpanes in the front and the right and left end sides in the vehicle cabin can effectively be prevented.

Then, it is characterized that the heat exchanger is a heat exchanger for heating that heats the air in the air passage (claim 12). There is a case where a heat exchanger for cooling is arranged on an upstream side of this heat exchanger for heating in the air passage, and there is also a case where this heat exchanger for heating is only housed. In this way, since the heat exchanger is the heat exchanger for heating that heats the air in the air passage, clarity of the windowpane can reliably be secured even in a cold season when the windowpane is likely to be fogged.

In addition, the first supply passage may be in a tunnel shape (claim 13). Since the first supply passage is in the tunnel shape, in the foot mode, a flow direction of the air that has flown through the first supply passage is adjusted in the tunnel, and thus the air can reliably be blown out toward the second supply passage.

Advantageous Effects of Invention

As described above, according to the invention, since the first door closes the first passage in the foot mode, the air that passes through the heat exchanger is distributed to the second passage. Then, in the foot mode, since the first door opens the first supply passage, and this first supply passage communicates between the first passage and the second passage, some of the air that is distributed to the second passage can flow to the first passage through the first supply passage.

In addition, in the foot mode, since the second door closes the center vent opening, the air that has flown to the first supply passage through the first passage is prevented from flowing to the center vent blowout port through the center vent opening. Then, since the second door opens the defrost opening, the air that has flown to the first passage can flow to the defrost blowout port through the defrost opening. Furthermore, in the foot mode, since the second door forms the second supply passage, the entry of which is positioned in the extending direction of the first supply passage, and the exit of which communicates with the side vent opening, most of the air that flows to the first passage through the first supply passage can flow to the side vent blowout port through the side vent opening.

Accordingly, in the foot mode, while the air is prevented from flowing to the center vent blowout port through the center vent opening, the air can flow toward the defrost blowout port through the defrost opening, and the air can also flow toward the side vent blowout port through the side vent opening. In addition, a volume of airflow that is delivered to the side vent blowout port through the side vent opening can be set to be larger than a volume of airflow that is delivered to the defrost blowout port through the defrost opening. Thus, fogging of the windowpanes in the front and the right and left side ends in the vehicle cabin can effectively be prevented.

In addition, since the second door integrates the door for opening and closing the defrost opening and the door for opening and closing the vent opening, the number of the door parts is reduced, and the weight of the vehicle air-conditioning unit is relatively reduced.

Particularly, according to the invention of claim 3, in the foot mode, since the third closing section of the first door partially closes the first supply passage, the exit of the first supply passage can easily be formed at the arbitrary position. Thus, freedom in design can be improved.

Particularly, according to the invention of claim 4, in the foot mode, the first closing section and the second closing section of the first door close the first passage, and the recessed section of the first door is positioned in the first supply passage and opens the first supply passage. Thus, even when the first passage is closed, some of the air that has been distributed to the second passage can flow to the first passage.

Particularly, according to the invention of claim 5, the fourth closing section of the second door includes the center vent closing portion and the step portion. Accordingly, in the case where the opening end on the second door side of the center vent opening and the opening end on the second door side of the side vent opening are positioned on the same flat plane, in the foot mode, that is, when the fourth closing section closes the center vent closing portion, the step portion of the second door is positioned on the upstream side of the side vent opening. Thus, the side vent opening is not closed, and the second supply passage can easily be formed.

Particularly, according to the invention of claim 6, the side vent opening is positioned further on the downstream side of the center vent opening arranged on the downstream side of the heat exchanger. Thus, in the foot mode, that is, even when the fourth closing section of the second door closes the center vent opening, the side vent opening is not closed, and the second supply passage can easily be formed.

Particularly, according to the invention of claim 7, in the defrost mode or the vent mode, since the first door closes the second passage, the air that has passed through the heat exchanger is distributed to the first passage. In addition, since the first door closes the first supply passage, the air that has been distributed to the first passage can be prevented from flowing to the second passage through the first supply passage, and the air can reliably be prevented from flowing to the foot blowout port through the foot opening.

Particularly, according to the invention of claim 8, in the case where the first door is the butterfly-type door according to claim 2 or claim 3, since the first closing section closes the second passage in the defrost mode or the vent mode, the air that has passed through the heat exchanger is distributed to the first passage. Furthermore, in this defrost mode or the vent mode, since either the second closing section or the second closing section and the third closing section close the first supply passage, the air that has been distributed to the first passage can be prevented from flowing to the second passage through the first supply passage, and the air can reliably be prevented from flowing to the foot blowout port through the foot opening.

Particularly, according to the invention of claim 9, in the case where the first door is the rotary-type door according to claim 4, since the first closing section and the second closing section close the second passage in the defrost mode or the vent mode, the air that has passed through the heat exchanger is distributed to the first passage. Furthermore, in this defrost mode or vent mode, since the first closing section closes the first supply passage, the air that has been distributed to the first passage can be prevented from flowing to the second passage through the first supply passage, and the air can reliably be prevented from flowing to the foot blowout port through the foot opening.

Particularly, according to the invention of claim 10, the fourth closing section of the second door includes the center vent closing portion and the step portion. Accordingly, in the case where the opening end on the second door side of the center vent opening and the opening end on the second door side of the side vent opening are positioned on the same flat plane, in the defrost or def/foot mode, that is, when the fourth closing section closes the center vent closing portion, the step portion is at the position separated from the side vent opening, thus does not close the side vent opening, and can easily form the second supply passage. In this way, since the air that has flown to the first passage can flow to the side vent blowout port through the side vent opening, fogging of the windowpanes in the front and the right and left side ends in the vehicle cabin can effectively be prevented.

Particularly, according to the invention of claim 11, the side vent opening is positioned further on the downstream side of the center vent opening arranged on the downstream side of the heat exchanger. Accordingly, in the defrost mode or the def/foot mode, that is, when the fourth closing section closes the center vent opening, the side vent opening is not closed, and the second supply passage can easily be formed. In this way, since the air that has flown to the first passage can flow to the side vent blowout port through the side vent opening, fogging of the windowpanes in the front and the right and left side ends in the vehicle cabin can effectively be prevented.

Particularly, according to the invention of claim 12, since the heat exchanger is the heat exchanger for heating that heats the air in the air passage, the clarity of the windowpane can reliably be secured even in the cold season when the windowpane is likely to be fogged.

Particularly, according to the invention of claim 13, the first supply passage is in the tunnel shape. Thus, in the foot mode, since the flow direction of the air that flows through the first supply passage is adjusted in the tunnel, the air can reliably be blown out toward the second supply passage.

BRIEF DESCRIPTION OF DRAWINGS

FIG. 5(a) is a schematic cross-sectional view of the air-conditioning unit that is cut at the position of the side vent opening, and FIG. 5(b) is a schematic cross-sectional view of the air-conditioning unit that is cut at the position of the center vent opening.

FIG. 6(a) is a schematic cross-sectional view of the air-conditioning unit that is cut at the position of the side vent opening, and FIG. 6(b) is a schematic cross-sectional view of the air-conditioning unit that is cut at the position of the center vent opening.

FIG. 7(a) is a schematic cross-sectional view of the air-conditioning unit that is cut at the position of the side vent opening, and FIG. 7(b) is a schematic cross-sectional view of the air-conditioning unit that is cut at the position of the center vent opening.

FIG. 8(a) is a schematic cross-sectional view of the air-conditioning unit that is cut at the position of the side vent opening, and FIG. 8(b) is a schematic cross-sectional view of the air-conditioning unit that is cut at the position of the center vent opening.

FIG. 10 is an enlarged view of a main section that shows a configuration in which a tunnel is provided in an air-conditioning case and in which the tunnel is arranged between a first supply passage and a second supply passage in the foot mode. Furthermore, FIG. 10(a) is a schematic cross-sectional view of the air-conditioning unit that is cut at the position of the side vent opening, and FIG. 10(b) is a schematic cross-sectional view of the air-conditioning unit that is cut at the position of the center vent opening.

FIG. 13(a) is a schematic cross-sectional view of the air-conditioning unit that is cut at the position of the side vent opening, and FIG. 13(b) is a schematic cross-sectional view of the air-conditioning unit that is cut at the position of the center vent opening.

FIG. 14(a) is a schematic cross-sectional view of the air-conditioning unit that is cut at the position of the side vent opening, and FIG. 14(b) is a schematic cross-sectional view of the air-conditioning unit that is cut at the position of the center vent opening.

FIG. 15(a) is a schematic cross-sectional view of the air-conditioning unit that is cut at the position of the side vent opening, and FIG. 15(b) is a schematic cross-sectional view of the air-conditioning unit that is cut at the position of the center vent opening.

FIG. 16(a) is a schematic cross-sectional view of the air-conditioning unit that is cut at the position of the side vent opening, and FIG. 16(b) is a schematic cross-sectional view of the air-conditioning unit that is cut at the position of the center vent opening.

FIG. 17(a) is a schematic cross-sectional view of the air-conditioning unit that is cut at the position of the side vent opening, and FIG. 17(b) is a schematic cross-sectional view of the air-conditioning unit that is cut at the position of the center vent opening.

FIG. 20(a) is a schematic cross-sectional view of the air-conditioning unit that is cut at the position of the side vent opening, and FIG. 20(b) is a schematic cross-sectional view of the air-conditioning unit that is cut at the position of the center vent opening.

FIG. 21(a) is a schematic cross-sectional view of the air-conditioning unit that is cut at the position of the side vent opening, and FIG. 21(b) is a schematic cross-sectional view of the air-conditioning unit that is cut at the position of the center vent opening.

FIG. 22(a) is a schematic cross-sectional view of the air-conditioning unit that is cut at the position of the side vent opening, and FIG. 22(b) is a schematic cross-sectional view of the air-conditioning unit that is cut at the position of the center vent opening.

FIG. 23(a) is a schematic cross-sectional view of the air-conditioning unit that is cut at the position of the side vent opening, and FIG. 23(b) is a schematic cross-sectional view of the air-conditioning unit that is cut at the position of the center vent opening.

FIG. 24(a) is a schematic cross-sectional view of the air-conditioning unit that is cut at the position of the side vent opening, and FIG. 24(b) is a schematic cross-sectional view of the air-conditioning unit that is cut at the position of the center vent opening.

DESCRIPTION OF EMBODIMENTS

Figure 1:
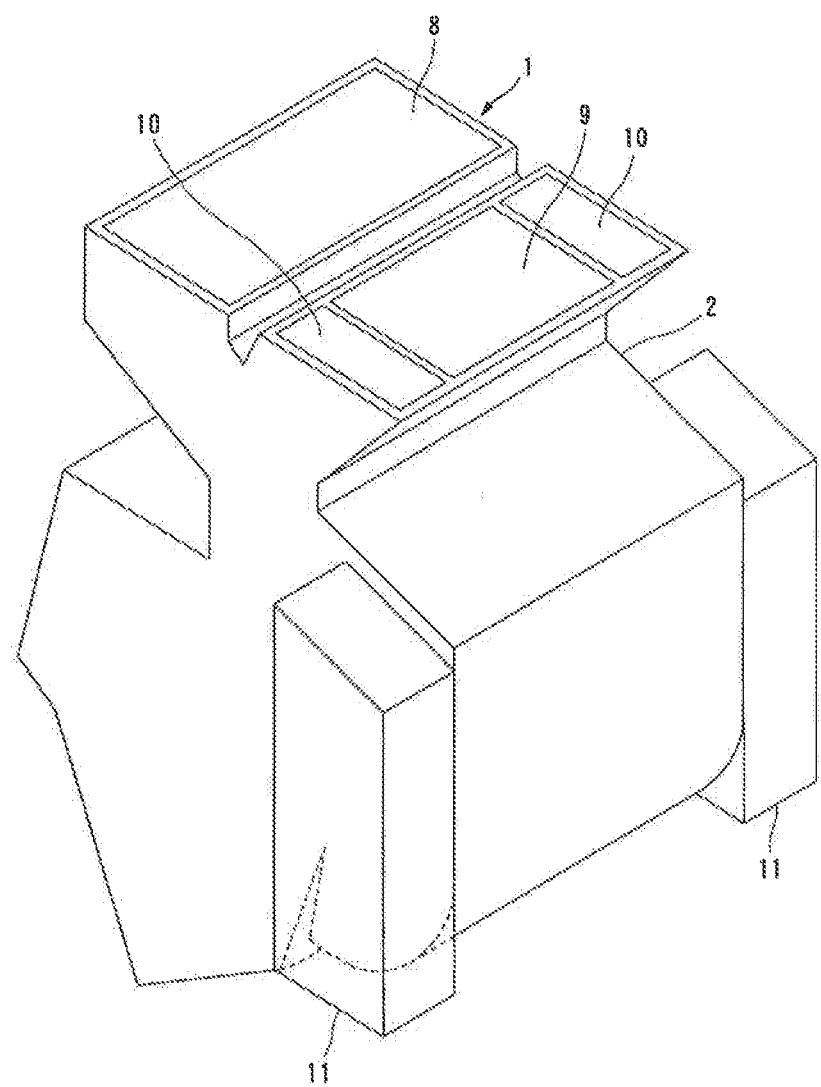
FIG. 1 is a perspective view of an overall configuration of an example of an air-conditioning unit according to this invention and shows a configuration in which a side vent opening, a center vent opening, and the side vent opening are arranged in this order and in which a foot opening is arranged to be displaced in a vehicle width direction.

A description will hereinafter be made on embodiments of this invention with reference to the accompanying drawings.

Example 1

FIG. 1 to FIG. 8 show Example 1 of a vehicle air-conditioning unit 1 that is installed in a vehicle. This vehicle air-conditioning unit 1 is joined to a blower unit, which is not shown, in a direction along a vehicle right and left direction. The blower unit is configured by including, for example, a blower unit case as well as an internal/external air switching door and an air blower that are housed in this blower unit case. In the blower unit case, an internal air introduction port for introducing the air in a vehicle cabin, an external air introduction port for introducing the air on the outside of the vehicle, and a blower port for blowing the air to the vehicle air-conditioning unit 1 side are opened.

As shown in FIG. 4 to FIG. 8, the vehicle air-conditioning unit 1 has an air-conditioning case 2 that is formed with an air passage 3 therein. An air suction port, which is not shown, is provided on the most upstream side in the air passage 3, and the air delivered from the blower unit flows into the air passage 3 through the air suction port.

A heat exchanger for cooling 4, such as an evaporator, is arranged on a relatively upstream side in the air passage 3. The heat exchanger for cooling 4 is arranged to cover a flow passage of the air passage 3, and the air passing through the air passage 3 passes through the heat exchanger for cooling 4. The heat exchanger for cooling 4 is appropriately joined to a compressor or the like, which is not shown, by piping, so as to constitute a refrigeration cycle. The heat exchanger for cooling 4 cools the air by exchanging heat between a coolant that flows through the refrigeration cycle and the air that passes through the heat exchanger for cooling 4, and dehumidifies the air that passes through the heat exchanger for cooling 4.

A heat exchanger for heating 5, such as a heater core, is arranged on a downstream side of the heat exchanger for cooling 4 in the air passage 3 with a specified gap being interposed therebetween. The heat exchanger for heating 5 heats the air that has been cooled or dehumidified when passing through the heat exchanger for cooling 4 and can reheat the air that has been cooled by the heat exchanger for cooling 4. As the heat exchanger for heating 5, for example, a heater core of hot water type that uses a coolant of a vehicle engine, a radiator using a refrigerant that is at a high temperature and compressed by the compressor, a PTC heater that uses electric power, or the like is used.

The air passage 3 has a cold air passage 3a, through which the air (cold air) that bypasses the heat exchanger for heating 5 flows, and a hot air passage 3b, through which the air (hot air) that passes through the heat exchanger for heating 5 flows.

Then, an air mix door 6 for adjusting an airflow volume ratio between the air flowing through the cold air passage 3a and the air flowing through the hot air passage 3b is arranged in the air passage 3. In this example, the air mix door 6 is a butterfly-type door and arranged at a merging point of the cold air passage 3a and the hot air passage 3b. More specifically, the air mix door 6 has two closing sections 6a, 6b, and can rotate about a rotational shaft 6c from a position where the cold air passage 3a is closed by the closing section 6a to set a ratio of the air flowing through the cold air passage 3a to zero (a position shown in FIG. 4) to a position where the upstream side of the heat exchanger for heating 5 is closed by the closing section 6a to set a ratio of the air flowing through the hot air passage 3b to zero (a position shown in FIG. 8). Noted that, in this example, the closing section 6b fulfills a role as a guide that prevents backflow of the cold air into the hot air passage 3b when the airflow volume ratio of the air flowing through the hot air passage 3b is set to zero by the closing section 6a.

The air passage 3 includes a defrost opening 8, a center vent opening 9, a side vent opening 10, and a foot opening 11 on the lowermost downstream side therein, that is, on the downstream side of the heat exchanger for heating 5.

The defrost opening 8 is arranged in the front in a vehicle traveling direction, and a downstream side end thereof is opened to an upper surface of the air-conditioning case 2. Then, the defrost opening 8 is connected to a defrost blowout port via a defrost duct, which is not shown, and this defrost blowout port blows out the air to an inner surface of a front windowpane in the vehicle traveling direction.

The center vent opening 9 is arranged adjacent to the defrost opening 8 at a rear position of the defrost opening 8 in the vehicle traveling direction, and a downstream side end thereof is opened to the upper surface of the air-conditioning case 2. Then, the center vent opening 9 is connected to a center vent blowout port via a center vent duct, which is not shown, and this center vent blowout port blows out the air to an upper body of a passenger in the vehicle cabin.

In this example, the side vent openings 10 are arranged adjacent to the center vent opening 9 at positions on both sides in the vehicle right and left direction with respect to the center vent opening 9, and downstream side ends thereof are opened to the upper surface of the air-conditioning case 2. Then, the side vent openings 10 are connected to a side vent blowout port via a side vent duct, which is not shown, and this side vent blowout port blows out the air to an inner surfaces of windowpanes on both sides in the vehicle right and left direction. In Example 1, an opening end on the upstream side of the each side vent opening 10 is arranged on the same plane as an opening end on the upstream side of the center vent opening 9.

The air passage 3 has a first passage 12 and a second passage 13, the first passage 12 being used to guide the air that has passed through the heat exchanger for cooling 4 or the air that has passed through the heat exchanger for cooling 4 and the heat exchanger for heating 5 to the defrost opening 8, the center vent opening 9, and the side vent opening 10, and the second passage 13 being branched from the first passage 12 and used to guide the air that has passed through the heat exchanger for cooling 4 or the air that has passed through the heat exchanger for cooling 4 and the heat exchanger for heating 5 to the foot opening 11.

In this example, the first passage 12 includes the cold air passage 3a, the hot air passage 3b, and a cold/hot air mixing space 3c, in which the cold air that has flown through the cold air passage 3a and the hot air that has flown through the hot air passage 3b are merged, so as to mix the cold air and the hot air. Then, a downstream side of the first passage 12 extends to the opening ends of the defrost opening 8, the center vent opening 9, and the side vent opening 10.

In this example, the second passage 13 is configured to be branched from the first passage 12 in the vicinity of the cold/hot air mixing space 3c and to extend rearward in the vehicle traveling direction. Then, a partitioning section 14 for partitioning between this second passage 13 and the first passage 12 extends from a branched position to an inner wall surface of the air-conditioning case 2.

In this example, the foot opening 11 continues to the second passage 13. An opening end on the upstream side of the foot opening 11 is opened to face the vehicle right and left direction with respect to the second passage 13, and a downstream side end of the foot opening 11 is opened to face downward of the vehicle. Then, the foot opening 11 is connected to a foot blowout port via a foot duct, which is not shown. Alternatively, the downstream side end of the foot opening 11 as is serves as the foot blowout port, and is appropriately configured to blow out the air to feet of the passenger in the vehicle cabin.

By the way, as shown in FIG. 4 to FIG. 8 and FIG. 10, a first door 15 for distributing the air that is delivered to the defrost opening 8, the center vent opening 9, and the side vent opening 10 and the air that is delivered to the foot opening 11 is arranged at the branched position between the first passage 12 and the second passage 13.

Figure 2:
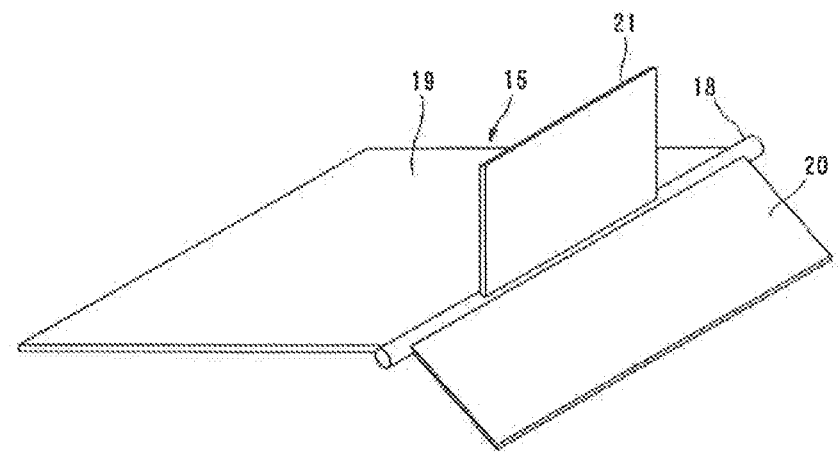
FIG. 2 is a perspective view of a configuration of a first door that includes a first closing section, a second closing section, and a third closing section in a case where the side vent opening, the center vent opening, and the side vent opening are arranged in this order.

This first door 15 is a butterfly-type door in Example 1 and, as shown in FIG. 2 and FIG. 10, is configured by including: a first closing section 19 that extends from a rotational shaft 18 in a radial direction of the rotational shaft 18 that is supported by the air-conditioning case 2; a second closing section 20 that extends in a different direction from the first closing section 19; and a third closing section 21 that extends in a different direction from the first closing section 19 and the second closing section 20.

Each of these closing sections 19, 20, 21 is in a flat plate shape. The first closing section 19 has the longest dimension that extends along the radial direction from the rotational shaft 18 while the second closing section 20 and the third closing section 21 have the shorter dimensions. A dimension of the first closing section 19 along a shaft direction of the rotational shaft 18 is substantially the same as a dimension of a first passage along the vehicle right and left direction. A dimension of the second closing section 20 along the shaft direction of the rotational shaft 18 is substantially the same as a dimension of a second passage along the vehicle right and left direction. A dimension of the third closing section 21 along the shaft direction of the rotational shaft 18 is substantially the same as a dimension of the center vent opening 9 along the vehicle right and left direction. Noted that, in FIG. 2, the third closing section 21 extends from a center portion in the shaft direction of the rotational shaft 18. This is because the third closing section 21 corresponds to such a configuration that the center vent opening and the side vent openings of the air-conditioning case 2 are arranged in an order of the side vent opening, the center vent opening, and the side vent opening along the vehicle right and left direction. In the configuration (not shown) that the center vent opening and the side vent openings are arranged in the order of the center vent opening, the side vent opening, and the center vent opening, although not shown, two of the third closing sections 21 are configured to extend from both end portions in the shaft direction of the rotational shaft 18.

In this Example 1, the first closing section 19 can rotate within a range from a position where it abuts against an inner surface of the air-conditioning case 2 on the heat exchanger for cooling 4 side to a position where it abuts against a tip portion of the partitioning section 14. Then, when the first closing section 19 abuts against the inner surface of the air-conditioning case 2 on the heat exchanger for cooling 4 side, the first passage 12 is closed, and thus the air that has passed through the heat exchanger for cooling 4 or the air that has passed through the heat exchanger for cooling 4 and the heat exchanger for heating 5 can be distributed to the second passage 13. When the first closing section 19 abuts against the tip portion of the partitioning section 14, the second passage 13 and further the foot opening 11 are closed, and thus the air that has passed through the heat exchanger for cooling 4 or the air that has passed through the heat exchanger for cooling 4 and the heat exchanger for heating 5 can be distributed to the first passage 12.

Figure 4:
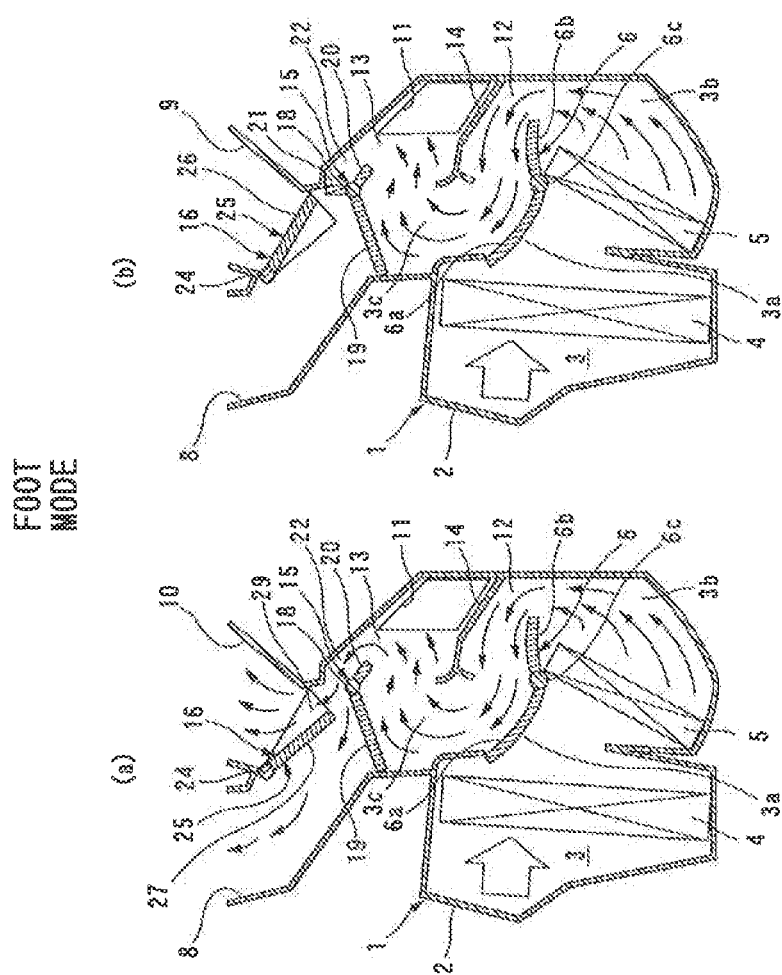
FIG. 4 schematically shows a state of the air-conditioning unit shown in FIG. 1 in a foot mode, the air-conditioning unit having a configuration that uses the first door as a butterfly-type door in FIG. 2 and the second door in FIG. 3. Furthermore, FIG. 4(*a*) is a schematic cross-sectional view of the air-conditioning unit that is cut at a position of the side vent opening, and FIG. 4(*b*) is a schematic cross-sectional view of the air-conditioning unit that is cut at a position of the center vent opening.

As shown in FIG. 4, when in a foot mode in this Example 1, the second closing section 20 is brought into a parallel state with an inner surface of the air-conditioning case 2 on the vehicle cabin side, and opens a first supply passage 22 that is positioned between the first door 15 and the air-conditioning case 2 and communicates between the second passage 13 and the first passage 12. Then, when not distributing the air to the foot opening 11, that is, when in a defrost mode or a vent mode, the second closing section 20 closes the first supply passage 22 and blocks the airflow from the first passage 12 to the second passage 13 or from the second passage 13 to the first passage 12.

The third closing section 21 partially closes the first supply passage 22 in the foot mode and thereby restricts a position where the first passage and the second passage communicate with each other. More specifically, as shown in FIG. 4(*a*), when being positioned at the side vent opening 10, the third closing section 21 does not exist in a space between the second passage 13 and the first passage 12 and forms an exit of the first supply passage 22. As shown in FIG. 4(*b*), when being positioned at the center vent opening 9, the third closing section 21 closes the space between the second passage 13 and the first passage 12, and thereby closes the exit of the first supply passage 22. Noted that, in this Example 1, the description has been made that the third closing section 21 is formed in the first door 15. However, the third closing section 21 is not necessarily limited thereto, but may be formed in the air-conditioning case 2 as shown in FIG. 20 to FIG. 24, which will be described below.

Figure 3:
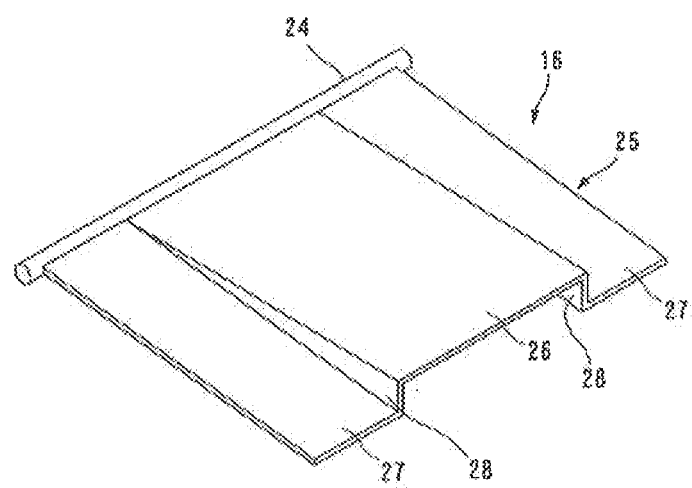
FIG. 3 is a perspective view of a configuration of a second door that includes a fourth closing section having a center vent closing portion and a step portion in the case where the side vent opening, the center vent opening, and the side vent opening are arranged in this order.

In addition, as shown in FIG. 4 to FIG. 8 and FIG. 10, a second door 16 is arranged between the defrost opening 8 and the center vent opening 9 and between the defrost opening 8 and the side vent opening 10. As shown in FIG. 3 and FIG. 10, this second door 16 is configured by having a rotational shaft 24 that is supported by the air-conditioning case 2 and a fourth closing section 25 that extends from this rotational shaft 24 in a radial direction of the rotational shaft 24. For example, in addition to a cantilever-type door that is shown in FIG. 3, although not shown, the butterfly-type door, a rotary-type door, or the like may appropriately be adopted for this second door 16.

Figure 5:
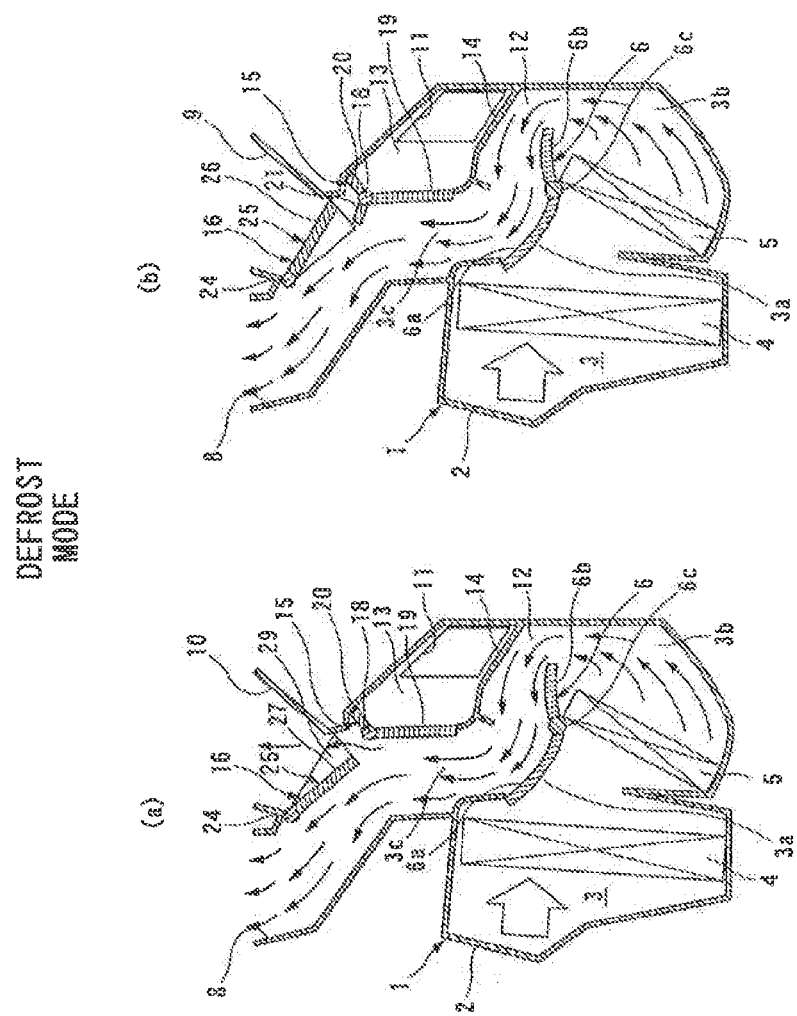
FIG. 5 schematically shows a state of the air-conditioning unit shown in FIG. 1 in a defrost mode, the air-conditioning unit having the configuration that uses the first door as the butterfly-type door in FIG. 2 and the second door in FIG. 3. Furthermore.
Figure 6:
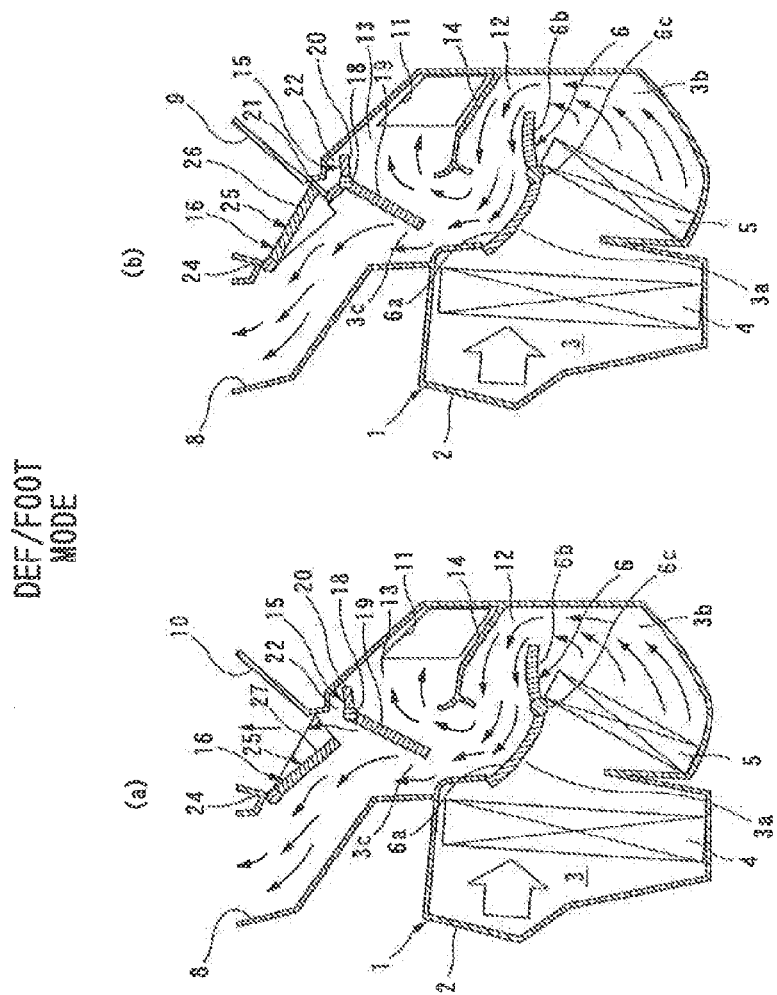
FIG. 6 schematically shows a state of the air-conditioning unit shown in FIG. 1 in a def/foot mode, the air-conditioning unit having the configuration that uses the first door as the butterfly-type door in FIG. 2 and the second door in FIG. 3. Furthermore.
Figure 7:
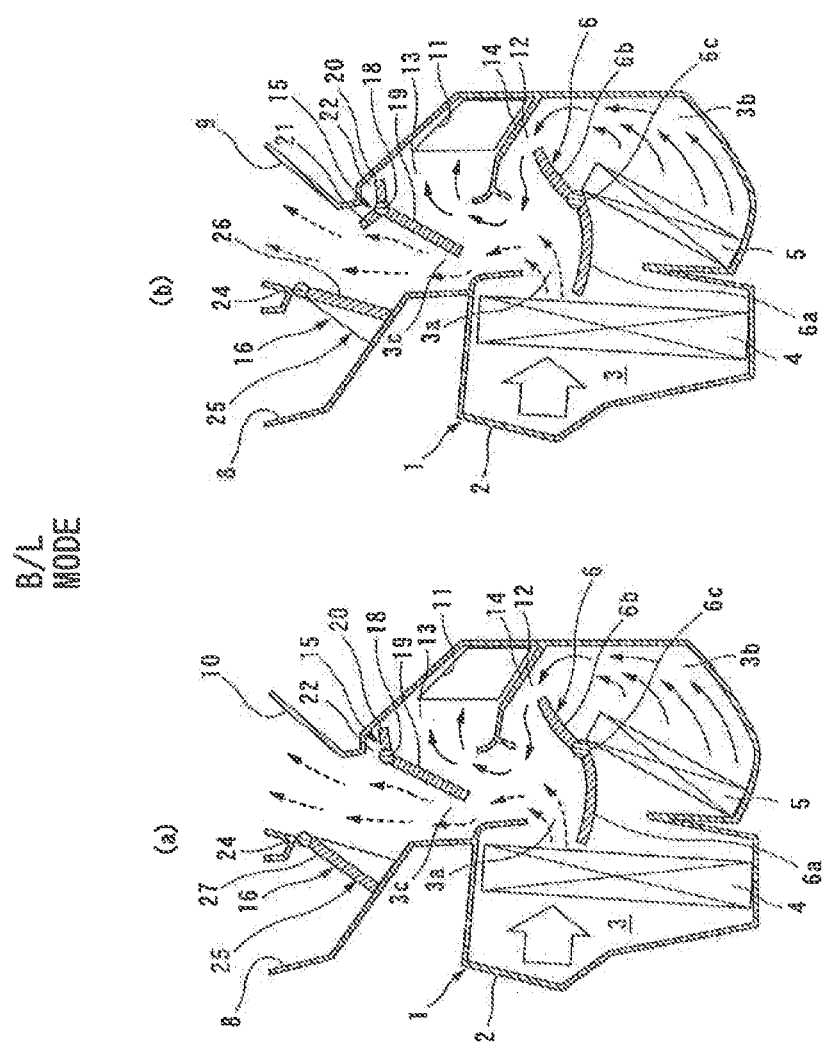
FIG. 7 schematically shows a state of the air-conditioning unit shown in FIG. 1 in a bi-level mode, the air-conditioning unit having the configuration that uses the first door as the butterfly-type door in FIG. 2 and the second door in FIG. 3. Furthermore.
Figure 8:
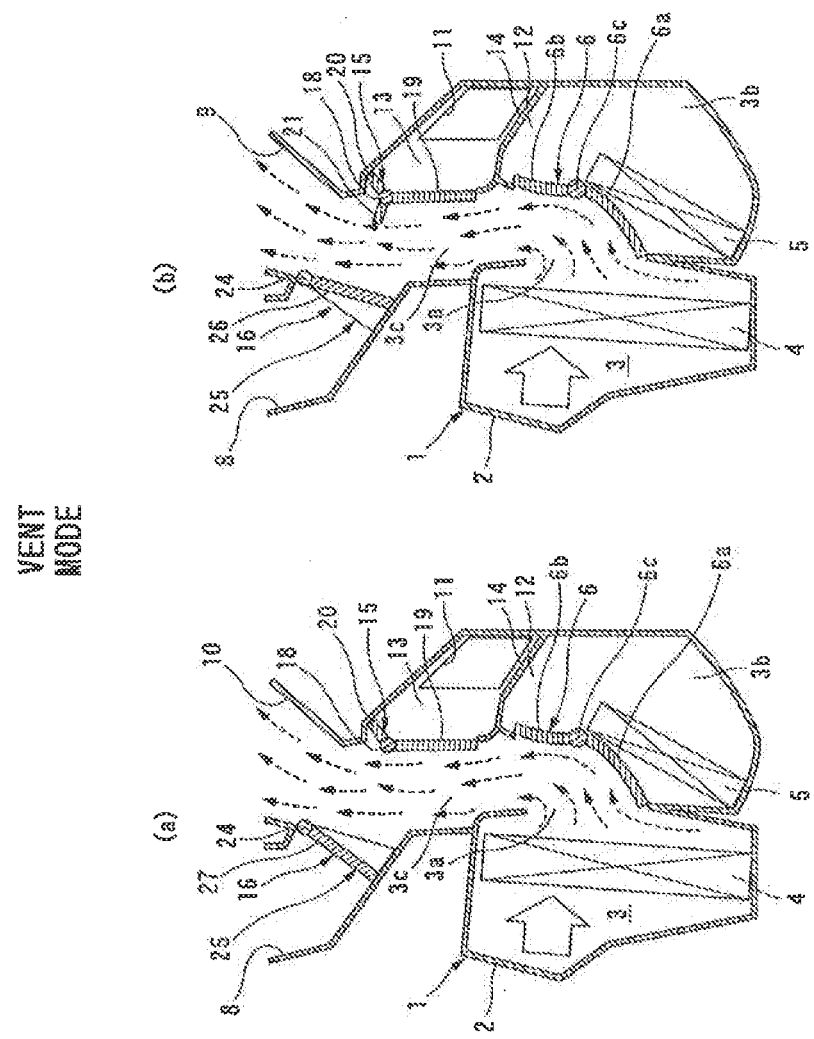
FIG. 8 schematically shows a state of the air-conditioning unit shown in FIG. 1 in a vent mode, the air-conditioning unit having the configuration that uses the first door as the butterfly-type door in FIG. 2 and the second door in FIG. 3. Furthermore.

As shown in FIG. 3 and FIG. 10, the fourth closing section 25 includes: a center vent closing portion 26 that can selectively close the defrost opening 8 and the center vent opening 9; and a step portion 27 that can close the defrost opening 8 but does not close the side vent opening 10 when the center vent closing portion 26 closes the center vent opening 9. In detail, each of the center vent closing portion 26 and the step portion 27 is in a flat plate shape, the step portion 27 is formed to be displaced in a peripheral direction of the rotational shaft 24 with respect to the center vent closing portion 26. In addition, as shown in FIG. 3, a connection plate 28 is arranged between the center vent closing portion 26 and the step portion 27. Just as described, there is a step between the center vent closing portion 26 and the step portion 27. Thus, when the center vent closing portion 26 closes the center vent opening 9, the step portion 27 does not close the side vent opening 10 but, as shown in FIG. 4 to FIG. 6, forms a second supply passage 29 between the step portion 27 and the side vent opening 10. Then, an entry of this second supply passage 29 is arranged in an extending direction of the first supply passage 22. More specifically, an extending direction of the step portion 27 is positioned on the first closing section 19 side of the first door 15 from the rotational shaft 18 of the first door 15.

Figure 9:
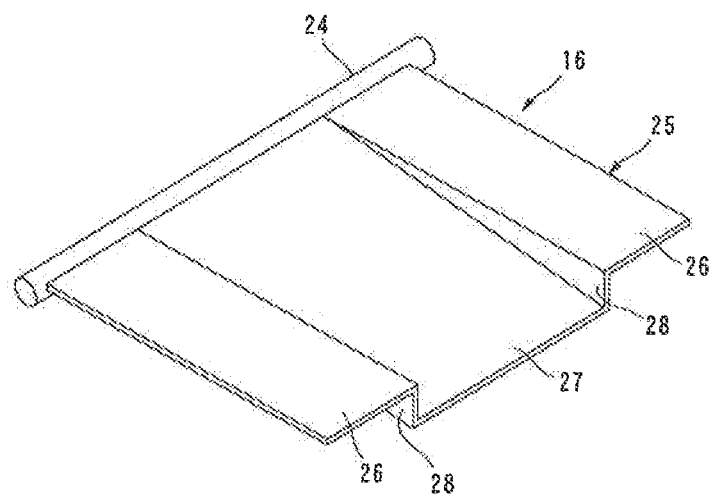
FIG. 9 is a perspective view of a modified example of the second door in FIG. 3 as the second door that includes the fourth closing section having the center vent closing portion and the step portion in the case where the side vent opening, the center vent opening, and the side vent opening are arranged in this order.
Figure 11:
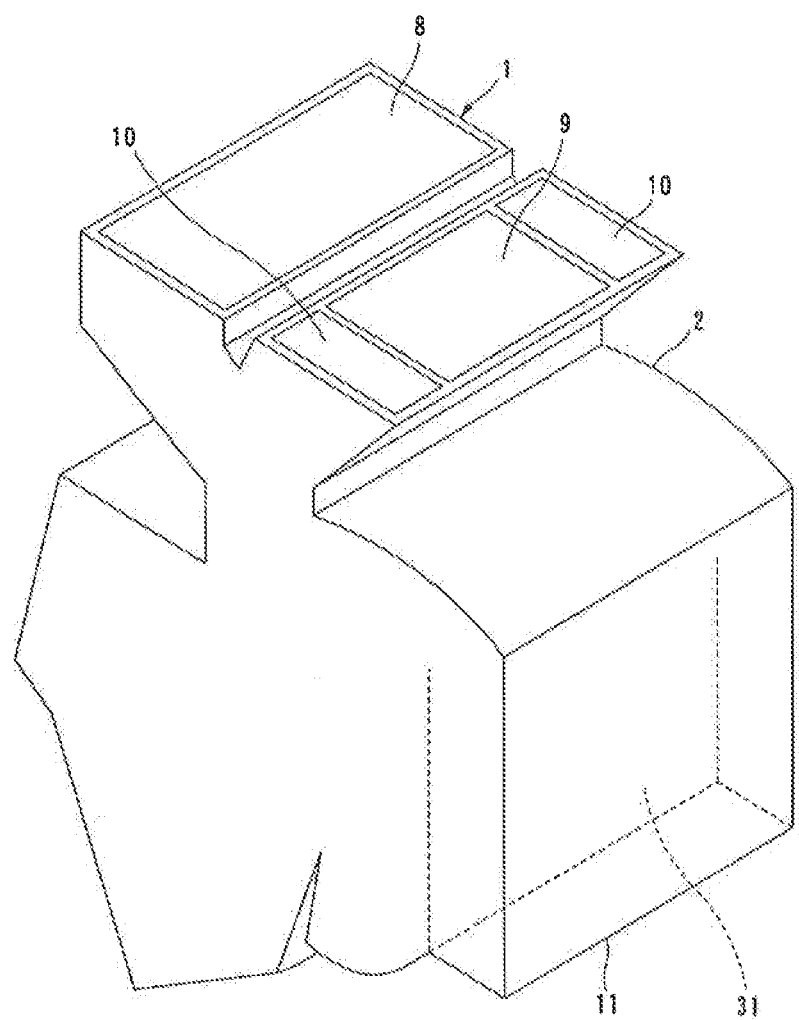
FIG. 11 is a perspective view of an overall structure of an example of the air-conditioning unit according to this invention that differs from the one shown in FIG. 1, and particularly shows a configuration in which the foot opening is arranged to be displaced to a rear side in the vehicle.

Noted that the second door 16 shown in FIG. 4 corresponds to the case where the side vent opening 10, the center vent opening 9, and the side vent opening 10 are arranged in this order in the air-conditioning case 2. Thus, in a case (not shown) where the center vent opening, the side vent opening, and the center vent opening are arranged in this order in the air-conditioning case 2, as shown in FIG. 9, the second door 16 may be configured by including the one step portion 27, the two center vent closing portions 26 arranged on both sides thereof, and the connection plates 28 for connecting the step portion 27 and the center vent closing portions 26.

Based on the above configuration of the vehicle air-conditioning unit 1, the airflow in the air-conditioning case 2 in each of the foot mode, a defrost mode, a def/foot mode, a bi-level mode, and the vent mode will be described in a cross section that is cut along the side vent opening 10 and a cross section that is cut along the center vent opening 9 by using FIG. 4 to FIG. 8.

(Foot Mode)

In the foot mode, the air mix door 6 closes the cold air passage 3*a* and fully opens the hot air passage 3*b*.

As shown in FIG. 4(*a*), in the cross section in which the vehicle air-conditioning unit 1 is cut along the side vent opening 10, the first closing section 19 of the first door 15 abuts against a portion of the air-conditioning case 2 in front of the cold/hot air mixing space 3*c*, and distributes the air that has passed through the heat exchanger for cooling 4 and the heat exchanger for heating 5 to the second passage 13. The second closing section 20 of the first door 15 does not abut against a portion of the air-conditioning case 2 at the rear of the second passage 13, and opens the first supply passage 22 that communicates between the second passage 13 and the first passage 12.

Meanwhile, the step portion 27 of the second door 16 faces the side vent opening 10, but does not abut against the side vent opening 10, and forms the second supply passage 29. The entry of this second supply passage 29 is formed at a position that is in the extending direction of the first supply passage 22 and where there is a slight gap between this second supply passage 29 and the first supply passage 22.

In this way, as shown by an outline arrow and solid arrows in FIG. 4(*a*), all the air that is delivered from the blower unit into the air passage 3 of the vehicle air-conditioning unit 1 is heated by the heat exchanger for heating 5 and turns into the hot air before being distributed to the second passage 13.

The air that has been distributed to the second passage 13 flows toward the foot opening 11 while some of the air flows along the extending direction of the first supply passage 22 and is blown out to the first passage 12.

While most of the air that has been blown out to the first passage 12 flows to the side vent opening 10 through the second supply passage 29, a remaining slight volume of the air flows to the defrost opening 8.

Next, as shown in FIG. 4(*b*), also in the cross section in which the vehicle air-conditioning unit 1 is cut along the center vent opening 9, the first closing section 19 of the first door 15 abuts against the portion of the air-conditioning case 2 in front of the cold/hot air mixing space 3*c*, and distributes the air that has passed through the heat exchanger for cooling 4 and the heat exchanger for heating 5 to the second passage 13. However, the third closing section 21 of the first door 15 abuts against the portion of the air-conditioning case 2 above the second passage 13, and closes the first supply passage 22.

Meanwhile, the center vent closing portion 26 of the second door 16 abuts against the center vent opening 9 and closes this opening 9.

In this way, as shown by an outline arrow and solid arrows in FIG. 4(*b*), all the air that is delivered from the blower unit into the air passage 3 of the vehicle air-conditioning unit 1 is heated by the heat exchanger for heating 5 and turns into the hot air before being distributed to the second passage 13.

The air that has been distributed to the second passage 13 flows toward the foot opening 11 since the first supply passage 22 is closed.

Accordingly, in the foot mode, it is possible to blow out the hot air from the defrost blowout port, the side vent blowout port, and the foot blowout port. It is also possible to set blowout volumes such that an airflow volume from the foot blowout port is the largest, followed by that from the side vent blowout port and that from the defrost blowout port in this order.

(Defrost Mode)

In the defrost mode, the air mix door 6 closes the cold air passage 3a and fully opens the hot air passage 3b.

As shown in FIG. 5(*a*), in the cross section of the vehicle air-conditioning unit 1 that is cut along the side vent opening 10, the first closing section 19 of the first door 15 abuts against the partitioning section 14, and distributes the air that has passed through the heat exchanger for cooling 4 and the heat exchanger for heating 5 to the first passage 12. The second closing section 20 of the first door 15 abuts against the portion of the air-conditioning case 2 above the second passage 13, and closes the first supply passage 22.

Meanwhile, the step portion 27 of the second door 16 faces the side vent opening 10, but does not abut against the side vent opening 10, and forms the second supply passage 29. The entry of this second supply passage 29 is formed at the position that is in the extending direction of the first supply passage 22 and where there is the slight gap between this second supply passage 29 and the first supply passage 22.

In this way, as shown by an outline arrow and solid arrows in FIG. 5(*a*), all the air that is delivered from the blower unit into the air passage 3 of the vehicle air-conditioning unit 1 is heated by the heat exchanger for heating 5 and turns into the hot air before being distributed to the first passage 12.

The air that has been distributed to the first passage 12 flows toward the defrost opening 8 and the side vent opening 10.

At this time, the step portion 27 faces the side vent opening 10. Thus, most of the air that has been distributed to the first passage 12 is guided to flow to the defrost opening 8, and the remaining slight volume of the air flows to the side vent opening 10.

Next, as shown in FIG. 5(*b*), also in the cross section in which the vehicle air-conditioning unit 1 is cut along the center vent opening 9, the first closing section 19 of the first door 15 abuts against the partitioning section 14, and distributes the air that has passed through the heat exchanger for cooling 4 and the heat exchanger for heating 5 to the first passage 12. The second closing section 20 of the first door 15 abuts against the portion of the air-conditioning case 2 above the second passage 13, and closes the first supply passage 22.

Meanwhile, the center vent closing portion 26 of the second door 16 abuts against the center vent opening 9 and closes this opening 9.

In this way, as shown by an outline arrow and solid arrows in FIG. 5(*b*), all the air that is delivered from the blower unit into the air passage 3 of the vehicle air-conditioning unit 1 is heated by the heat exchanger for heating 5 and turns into the hot air before being distributed to the first passage 12.

The air that has been distributed to the first passage 12 flows toward the defrost opening 8 and the center vent opening 9.

At this time, since the center vent opening 9 is closed, the air that has been distributed to the first passage 12 flows to the defrost opening 8.

Accordingly, in the defrost mode, it is possible to blow out the hot air from the defrost blowout port and the side vent blowout port. It is also possible to set the airflow volume from the defrost blowout port to be larger than the airflow volume from the side vent blowout port.

(Def/Foot Mode)

In the def/foot mode, the air mix door 6 closes the cold air passage 3a and fully opens the hot air passage 3b.

As shown in FIG. 6(*a*), in the cross section in which the vehicle air-conditioning unit 1 is cut along the side vent opening 10, the first closing section 19 of the first door 15 is positioned in the middle between the portion of the air-conditioning case 2 in front of the cold/hot air mixing space 3c and the partitioning section 14, and distributes the air that has passed through the heat exchanger for cooling 4 and the heat exchanger for heating 5 to the first passage 12 and the second passage 13. The second closing section 20 of the first door 15 does not abut against the portion of the air-conditioning case 2 at the rear of the second passage 13, and opens the first supply passage 22 that communicates between the second passage 13 and the first passage 12.

Meanwhile the step portion 27 of the second door 16 faces the side vent opening 10, but does not abut against the side vent opening 10, and forms the second supply passage 29. The entry of this second supply passage 29 is formed at the position where there is the slight gap between this second supply passage 29 and the first supply passage 22.

In this way, as shown by an outline arrow and solid arrows in FIG. 6(*a*), all the air that is delivered from the blower unit into the air passage 3 of the vehicle air-conditioning unit 1 is heated by the heat exchanger for heating 5 and turns into the hot air. Then, some of the air is distributed to the first passage 12 while the other is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, the step portion 27 faces the side vent opening 10. Thus, most of the air that has been distributed to the first passage 12 is guided to flow to the defrost opening 8, and the remaining slight volume of the air flows to the side vent opening 10.

Next, as shown in FIG. 6(*b*), also in the cross section in which the vehicle air-conditioning unit 1 is cut along the center vent opening 9, the first closing section 19 of the first door 15 is positioned in the middle between the portion of the air-conditioning case 2 in front of the cold/hot air mixing space 3c and the partitioning section 14, and distributes the air that has passed through the heat exchanger for cooling 4 and the heat exchanger for heating 5 to the first passage 12 and the second passage 13. The second closing section 20 of the first door 15 does not abut against the portion of the air-conditioning case 2 at the rear of the second passage 13, and opens the first supply passage 22 that communicates between the second passage 13 and the first passage 12. The third closing section 21 of the first door 15 does not abut against the air-conditioning case 2.

Meanwhile, the center vent closing portion 26 of the second door 16 abuts against the center vent opening 9 and closes this opening 9.

In this way, as shown by an outline arrow and solid arrows in FIG. 6(*b*), all the air that is delivered from the blower unit into the air passage 3 of the vehicle air-conditioning unit 1 is heated by the heat exchanger for heating 5 and turns into the hot air. Then, some of the air is distributed to the first passage 12 while the other is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, since the center vent opening 9 is closed, the air that has been distributed to the first passage 12 flows to the defrost opening 8.

Accordingly, in the def/foot mode, it is possible to blow out the hot air from the defrost blowout port, the side vent blowout port, and the foot blowout port. It is also possible to set the blowout volumes such that the airflow volumes from the defrost blowout port and the foot blowout port are large and that the airflow volume from the side vent blowout port is small.

(Bi-Level Mode)

In the bi-level mode, the air mix door 6 opens the cold air passage 3a and the hot air passage 3b at an arbitrary ratio, so as to produce the air at an adjusted temperature.

As shown in FIG. 7(a), in the cross section in which the vehicle air-conditioning unit 1 is cut along the side vent opening 10, the first closing section 19 of the first door 15 is positioned in the middle between the portion of the air-conditioning case 2 in front of the cold/hot air mixing space 3c and the partitioning section 14, and distributes the air that has passed through the heat exchanger for cooling 4 or the air that has passed through the heat exchanger for cooling 4 and the heat exchanger for heating 5 to the first passage 12 and the second passage 13. The second closing section 20 of the first door 15 does not abut against the portion of the air-conditioning case 2 at the rear of the second passage 13, and opens the first supply passage 22 that communicates between the second passage 13 and the first passage 12.

Meanwhile, the step portion 27 of the second door 16 abuts against a portion of the air-conditioning case 2 in the front side of the defrost opening 8 and closes this opening 8.

In this way, as shown by an outline arrow, solid arrows, and broken arrows in FIG. 7(a), the air that is delivered from the blower unit into the air passage 3 of the vehicle air-conditioning unit 1 is divided into the cold air that is cooled by the heat exchanger for cooling 4 and the hot air that is heated by the heat exchanger for heating 5 and merged in the cold/hot air mixing space 3c. Then, most of the cold air is distributed to the first passage 12, and most of the hot air is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, since the defrost opening 8 is closed, the air that has been distributed to the first passage flows to the side vent opening 10.

Next, as shown in FIG. 7(b), also in the case where the vehicle air-conditioning unit 1 is cut along the center vent opening 9, the first closing section 19 of the first door 15 is positioned in the middle between the portion of the air-conditioning case 2 in front of the cold/hot air mixing space 3c and the partitioning section 14, and distributes the air that has passed through the heat exchanger for cooling 4 or the air that has passed through the heat exchanger for cooling 4 and the heat exchanger for heating 5 to the first passage 12 and the second passage 13. The second closing section 20 of the first door 15 does not abut against the portion of the air-conditioning case 2 at the rear of the second passage 13, and opens the first supply passage 22 that communicates between the second passage 13 and the first passage 12. The third closing section 21 of the first door 15 does not abut against the air-conditioning case 2.

Meanwhile, the center vent closing portion 26 of the second door 16 abuts against the portion of the air-conditioning case 2 in the front side of the defrost opening 8 and closes this opening 8.

In this way, as shown by an outline arrow, solid arrows, and broken arrows in FIG. 7(b), the air that is delivered from the blower unit into the air passage 3 of the vehicle air-conditioning unit 1 is divided into the cold air that is cooled by the heat exchanger for cooling 4 and the hot air that is heated by the heat exchanger for heating 5 and merged in the cold/hot air mixing space 3c. Then, most of the cold air is distributed to the first passage 12, and most of the hot air is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, since the defrost opening 8 is closed, the air that has been distributed to the first passage 12 flows to the center vent opening 9.

Accordingly, in the bi-level mode, it is possible to blow out the air from the center vent blowout port, the side vent blowout port, and the foot blowout port. Here, it is possible to blow out the air at a low temperature from the center vent blowout port and the side vent blowout port and to blow out the air at a high temperature from the foot blowout port.

(Vent Mode)

In the vent mode, the air mix door 6 fully opens the cold air passage 3a and closes the hot air passage 3b.

As shown in FIG. 8(a), in the cross section in which the vehicle air-conditioning unit 1 is cut along the side vent opening 10, the first closing section 19 of the first door 15 abuts against the partitioning section 14, and distributes the air that has passed through the heat exchanger for cooling 4 to the first passage 12. The second closing section 20 of the first door 15 abuts against the portion of the air-conditioning case 2 above the second passage 13, and closes the first supply passage 22.

Meanwhile, the step portion 27 of the second door 16 abuts against the portion of the air-conditioning case 2 in the front side of the defrost opening 8 and closes this opening 8.

In this way, as shown by an outline arrow and broken arrows in FIG. 8(a), all the air that is delivered from the blower unit into the air passage 3 of the vehicle air-conditioning unit 1 is cooled by the heat exchanger for cooling 4 and turns into the cold air before being distributed to the first passage 12.

The air that has been distributed to the first passage 12 flows toward the defrost opening 8 and the side vent opening 10.

At this time, since the defrost opening 8 is closed, the air that has been distributed to the first passage 12 flows to the side vent opening 10.

Next, as shown in FIG. 8(b), also in the cross section in which the vehicle air-conditioning unit 1 is cut along the center vent opening 9, the first closing section 19 of the first door 15 abuts against the partitioning section 14, and distributes the air that has passed through the heat exchanger for cooling 4 to the first passage 12. The second closing section 20 of the first door 15 abuts against the portion of the air-conditioning case 2 above the second passage 13, and closes the first supply passage 22. The third closing section 21 of the first door 15 does not abut against the air-conditioning case 2.

Meanwhile, the center vent closing portion 26 of the second door 16 abuts against the portion of the air-conditioning case 2 in the front side of the defrost opening 8 and closes this opening 8.

In this way, as shown by an outline arrow and broken arrows in FIG. 8(b), all the air that is delivered from the blower unit into the air passage 3 of the vehicle air-conditioning unit 1 is cooled by the heat exchanger for cooling 4 and turns into the cold air before being distributed to the first passage 12.

The air that has been distributed to the first passage 12 flows toward the defrost opening 8 and the center vent opening 9.

At this time, since the defrost opening 8 is closed, the air that has been distributed to the first passage 12 flows to the center vent opening 9.

Accordingly, in the vent mode, it is possible to blow out the air from the center vent blowout port and the side vent blowout port.

Then, as shown in FIG. 10(a), in the cross section in which the vehicle air-conditioning unit 1 is cut along the side vent opening 10, the first supply passage 22 may be configured as a tunnel 30 in the air-conditioning case 2. When the second supply passage 29 is formed, a slight gap is formed between an exit of this tunnel 30 and the entry of the second supply passage 29. In addition, as shown in FIG. 10(b), in the cross section in which the vehicle air-conditioning unit 1 is cut along the center vent opening 9, the tunnel 30 is preferably closed by a tunnel closing section 23. Even when the air that has been distributed to the second passage attempts to be blown out to the first passage through the tunnel 30, the tunnel closing section 23 prevents the air from flowing to the center vent opening 9. Thus, it is possible to effectively blow out the air to the side vent opening 10. Then, when the first door 15 abuts against the partitioning section 14 and distributes the air that has passed through the heat exchanger to the first passage (not shown), an end on the second passage side of this tunnel 30 is closed by the second closing section 20 of the first door 15 in the cross section in which the vehicle air-conditioning unit 1 is cut along the center vent opening 9.

Accordingly, when the hot air that has flown into the first supply passage 22 flows through the tunnel 30, a flow direction thereof is adjusted. Thus, a required airflow volume of the hot air that has flown out of the tunnel 30 can reliably be delivered to the second supply passage 29, and the airflow volume that is delivered to the defrost opening 8 can relatively be reduced. Therefore, it is possible to reliably increase a volume of the air that flows through the side vent opening 10 and is blown out from the side vent blowout port to be larger than a volume of the air that flows through the defrost opening 8 and is blown out from the defrost blowout port.

Example 2

FIG. 11 to FIG. 18 show Example 2 of the vehicle air-conditioning unit 1 that is used for a vehicle air-conditioning system. A description will hereinafter be made on Example 2 of the vehicle air-conditioning unit 1 by using FIG. 11 to FIG. 18. Noted that the same components as those in Example 1 of the vehicle air-conditioning unit 1 are denoted by the same reference signs as those of Example 1, and the description thereof will not basically be made.

The vehicle air-conditioning units 1 shown in FIG. 13 to FIG. 17 are common in a point that it is joined to the blower unit, which is not shown, in a direction along the vehicle right and left direction, a point that the air passage 3 is formed in the air-conditioning case 2, a point that the heat exchanger for cooling 4, the air mix door 6, and the heat exchanger for heating 5 are appropriately arranged in the air passage 3, and a point that the defrost opening 8, the center vent opening 9, the side vent opening 10, and the foot opening 11 are provided on the lowermost downstream side of the air passage 3.

In addition, the vehicle air-conditioning units 1 are also common in a point that the first passage 12, the second passage 13 that is branched from the first passage 12, the first door 15 that is arranged at the branched position between the first passage 12 and the second passage 13, and the second door 16 that is arranged between the defrost opening 8 and the vent openings 9, 10 are provided on the downstream side of the heat exchanger for heating 5 in the air passage 3. Furthermore, the vehicle air-conditioning units 1 are common in a point that the second door 16 is configured by including the fourth closing section 25 having the center vent closing portion 26 and the step portion 27 shown in FIG. 3 to FIG. 9.

Noted that, in this Example 2, the first supply passage 22 is included as a part of the branched position in the air-conditioning case 2.

Meanwhile, the vehicle air-conditioning unit 1 shown in Example 2 differs from that in Example 1 in terms of arrangement of the second passage 13 and the foot opening 11 and the configuration of the first door 15.

In other words, as shown in FIG. 13 to FIG. 17, the second passage 13 is branched rearward in the vehicle traveling direction from the first passage 12, and then extends downward of the vehicle. The foot opening 11 is arranged on the lowermost downstream side of the second passage 13. Then, the first passage 12 and a combination of the second passage 13 and the foot opening 11 are partitioned by a partitioning section 31 that includes a portion extending along a vertical direction of the vehicle and a portion extending while being curved in a longitudinal direction of the vehicle.

The first door 15 is the rotary-type door, and as shown in FIG. 12 to FIG. 17, is configured by including: the rotational shaft 18 that is supported by the air-conditioning case 2; the first closing section 19 that extends from this rotational shaft 18 along the radial direction of the rotational shaft 18; the second closing section 20 that extends from the rotational shaft 18 along the radial direction of the rotational shaft 18 in the different direction from the first closing section 19; an outer peripheral wall surface 32 that connects the first closing section 19 and the second closing section 20 in an arcuate shape; and two lateral surface sections S, S that cover lateral surfaces of the outer peripheral wall surface 32.

Figure 12:
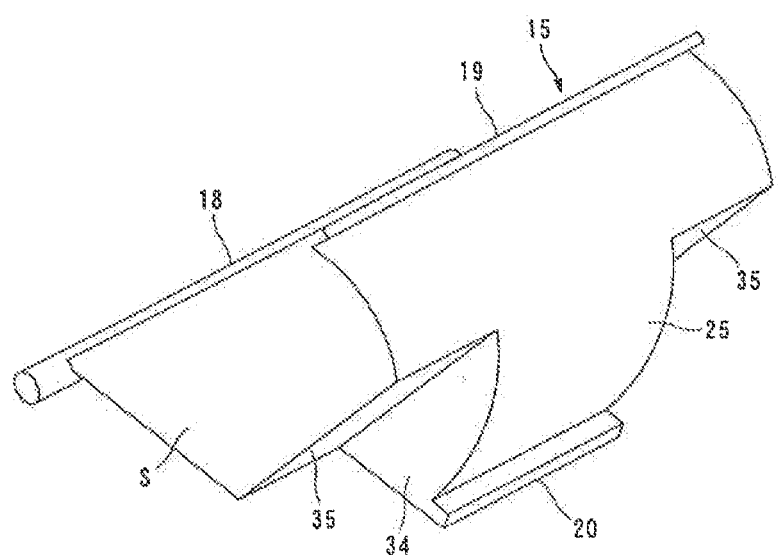
FIG. 12 is a perspective view of a configuration of the first door as a rotary-type door that has a recessed section at a position where a portion of a second closing section, a portion of a lateral surface section, and a portion of an outer peripheral wall surface are notched in a case where the center vent opening, the side vent opening, and the center vent opening are arranged in this order.
Figure 13:
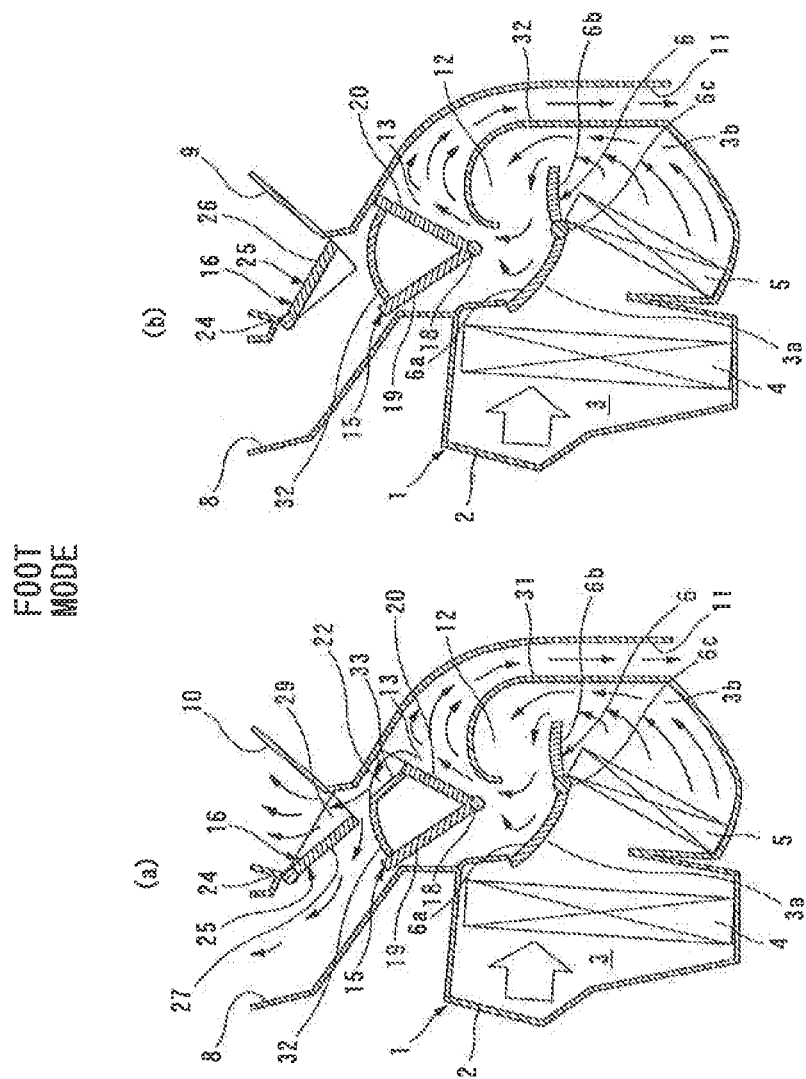
FIG. 13 schematically shows a state of the air-conditioning unit shown in FIG. 11 in the foot mode, the air-conditioning unit having a configuration that uses the first door as the rotary-type door in FIG. 12 and the second door in FIG. 3. Furthermore.
Figure 14:
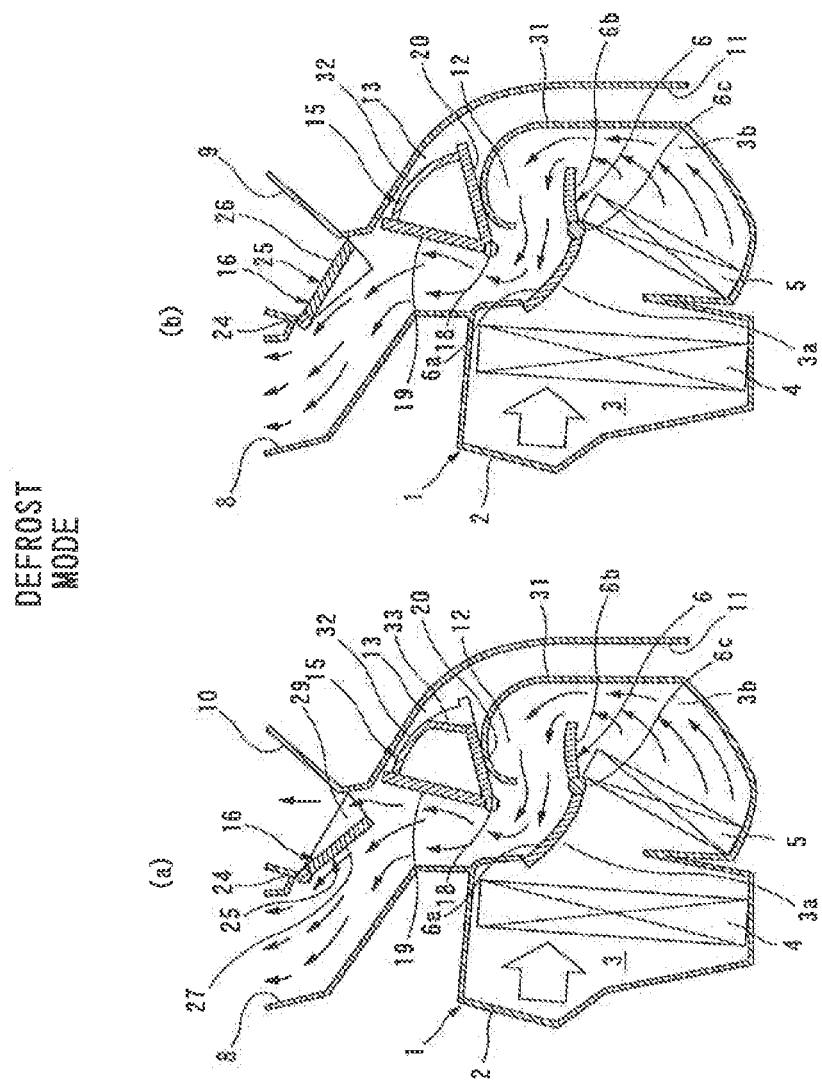
FIG. 14 schematically shows a state of the air-conditioning unit shown in FIG. 11 in the defrost mode, the air-conditioning unit having the configuration that uses the first door as the rotary-type door in FIG. 12 and the second door in FIG. 3. Furthermore.
Figure 15:
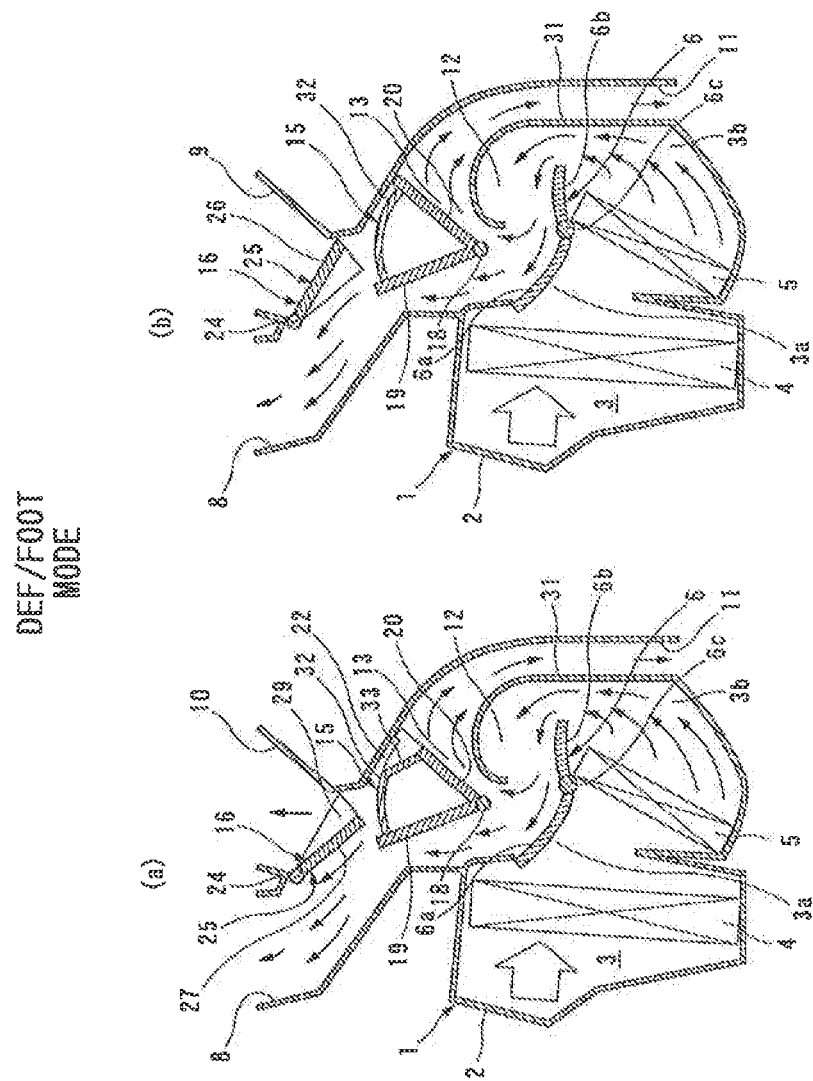
FIG. 15 schematically shows a state of the air-conditioning unit shown in FIG. 11 in the def/foot mode, the air-conditioning unit having the configuration that uses the first door as the rotary-type door in FIG. 12 and the second door in FIG. 3. Furthermore.
Figure 16:
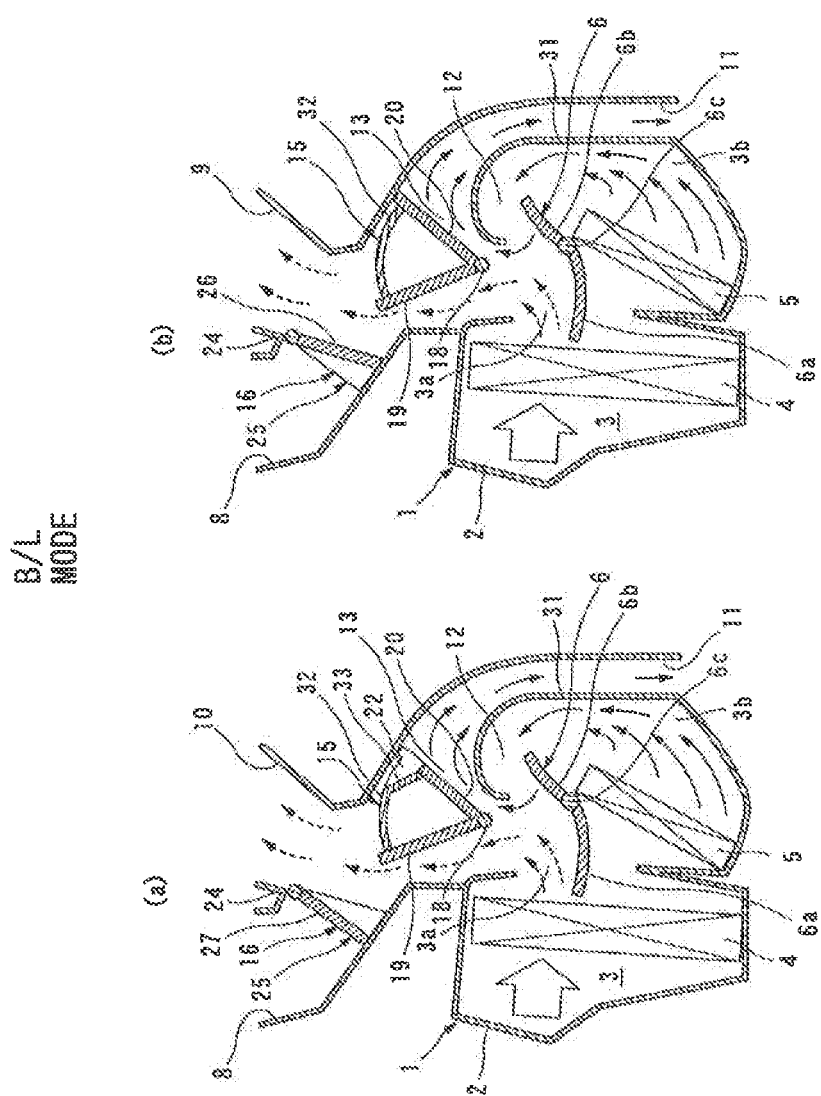
FIG. 16 schematically shows a state of the air-conditioning unit shown in FIG. 11 in the bi-level mode, the air-conditioning unit having the configuration that uses the first door as the rotary-type door in FIG. 12 and the second door in FIG. 3. Furthermore.
Figure 17:
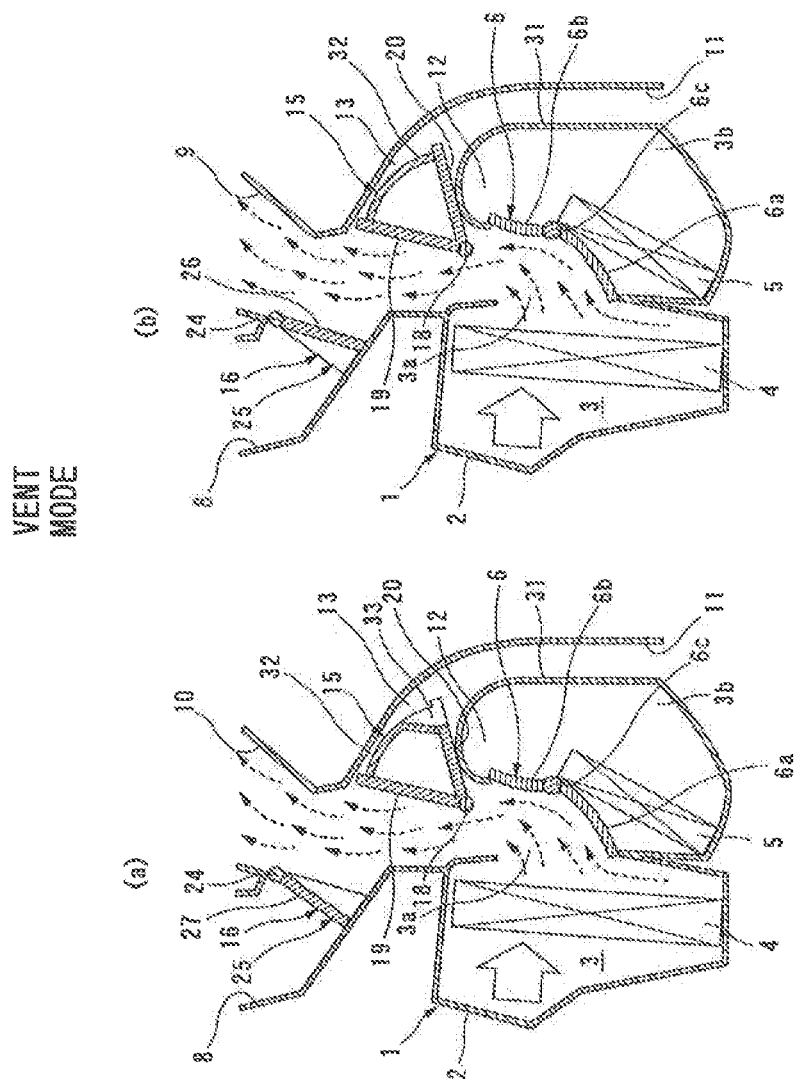
FIG. 17 schematically shows a state of the air-conditioning unit shown in FIG. 11 in the vent mode, the air-conditioning unit having the configuration that uses the first door as the rotary-type door in FIG. 12 and the second door in FIG. 3. Furthermore.

Then, as shown in FIG. 12, this first door 15 has two recessed sections 33 at positions, at each of which a portion of the second closing section 20, a portion of the lateral surface section S, and a portion of the outer peripheral wall surface 32 are notched. Each of these recessed sections 33 has: one wall surface 34 that faces the vehicle right and left direction when being attached to the air-conditioning case 2; and one wall surface 35 that faces the vehicle cabin side of the vehicle or substantially upward. Noted that, in this example, each of the wall surfaces 34, 35 is described as a flat surface. However, each of the wall surfaces 34, 35 is not necessarily limited to the flat surface. Upon necessity, each of the wall surfaces 34, 35 may be configured by successively connecting curved surfaces to reduce ventilation resistance or to prevent generation of wind noise.

Figure 18:
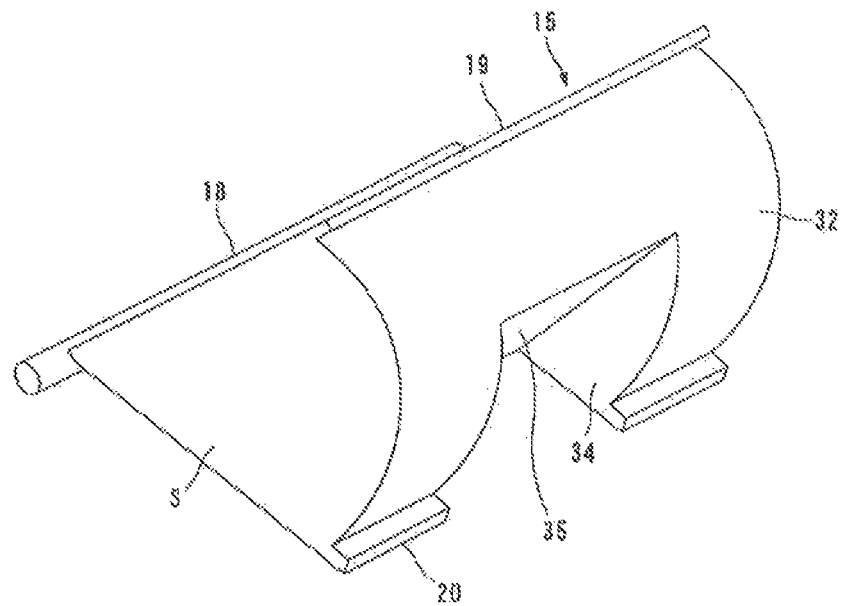
FIG. 18 is a perspective view of a modified example of the first door in FIG. 12, in which the rotary-type door serves as the first door in the case where the vent openings are arranged in the order of the side vent opening, the center vent opening, and the side vent opening in the air-conditioning unit, the rotary-type door having the first closing section, the second closing section, the outer peripheral wall surface, and the recessed section formed by notching a portion of the second closing section.

The first door 15 shown in FIG. 12 corresponds to the case where the side vent opening 10, the center vent opening 9, and the side vent opening 10 are arranged in this order in the air-conditioning case 2. Although not shown, in the case where the center vent opening, the side vent opening, and the center vent opening are arranged in this order in the air-conditioning case 2, one recessed section 33 may be provided at a position where the portion of the second closing section 20 and the portion of the outer peripheral wall surface 32 are notched as shown in FIG. 18. In this case, the recessed section 33 has: two wall surfaces 34 that face the vehicle right and left direction when being attached to the air-conditioning case 2; and one wall surface 35 that faces the vehicle cabin side of the vehicle or substantially upward. Also, in this example, each of the wall surfaces 34, 35 is not necessarily limited to the flat surface. Upon necessity, each of the wall surfaces 34, 35 may be configured by successively connecting the curved surfaces to reduce the ventilation resistance or to prevent the generation of the wind noise.

Based on the above configuration of the vehicle air-conditioning unit 1, the airflow in the air-conditioning case 2 in each of the foot mode, the defrost mode, the def/foot mode, the bi-level mode, and the vent mode will be described in the cross section that is cut along the side vent opening 10 and the cross section that is cut along the center vent opening 9 by using FIG. 13 to FIG. 17.

(Foot Mode)

In the foot mode, the air mix door 6 closes the cold air passage 3a and fully opens the hot air passage 3b.

As shown in FIG. 13(a), in the cross section in which the vehicle air-conditioning unit 1 is cut along the side vent opening 10, the first closing section 19 of the first door 15 abuts against the portion of the air-conditioning case 2 in front of the cold/hot air mixing space 3c, the second closing section 20 does not abut against the partitioning section 31, and thus the air that has passed through the heat exchanger for cooling 4 and the heat exchanger for heating 5 is distributed to the second passage. The wall surfaces 34, 35 of the recessed section 33 of the first door 15 and the portion of the air-conditioning case 2 at the rear of the second passage 13 open the first supply passage 22 that communicates between the second passage 13 and the first passage 12.

Meanwhile, the step portion 27 of the second door 16 faces the side vent opening 10, but does not abut against the side vent opening 10, and forms the second supply passage 29. The entry of this second supply passage 29 is formed at the position that is in the extending direction of the first supply passage 22 and where there is the slight gap between this second supply passage 29 and the first supply passage 22.

In this way, as shown by an outline arrow and solid arrows in FIG. 13(a), all the air that is delivered from the blower unit into the air passage 3 of the vehicle air-conditioning unit 1 is heated by the heat exchanger for heating 5 and turns into the hot air before being distributed to the second passage 13.

The air that has been distributed to the second passage 13 flows toward the foot opening 11 while some of the air flows along the extending direction of the first supply passage 22 and is blown out to the first passage 12.

While most of the air that has been blown out to the first passage 12 flows to the side vent opening 10 through the second supply passage 29, the remaining slight volume of the air flows to the defrost opening 8.

Next, as shown in FIG. 13(b), also in the cross section in which the vehicle air-conditioning unit 1 is cut along the center vent opening 9, the first closing section 19 of the first door 15 abuts against the portion of the air-conditioning case 2 in front of the cold/hot air mixing space 3c, and distributes the air that has passed through the heat exchanger for cooling 4 and the heat exchanger for heating 5 to the second passage 13. However, in the cross section that is cut along the center vent opening 9, the first door 15 is not provided with the recessed section 33, and thus closes the first supply passage 22.

Meanwhile, the center vent closing portion 26 of the second door 16 abuts against the center vent opening 9 and closes this opening 9.

In this way, as shown by an outline arrow and solid arrows in FIG. 13(b), all the air that is delivered from the blower unit into the air passage 3 of the vehicle air-conditioning unit 1 is heated by the heat exchanger for heating 5 and turns into the hot air before being distributed to the second passage 13.

Since the first supply passage 22 is closed, the air that has been distributed to the second passage 13 flows toward the foot opening 11.

Accordingly, in the foot mode, it is possible to blow out the hot air from the defrost blowout port, the side vent blowout port, and the foot blowout port. It is also possible to set the blowout volumes such that the airflow volume from the foot blowout port is the largest, followed by that from the side vent blowout port and that from the defrost blowout port in this order.

(Defrost Mode)

In the defrost mode, the air mix door 6 closes the cold air passage 3a and fully opens the hot air passage 3b.

As shown in FIG. 14(a), in the cross section in which the vehicle air-conditioning unit 1 is cut along the side vent opening 10, the first closing section 19 of the first door 15 abuts against the portion of the air-conditioning case 2 above the second passage 13, the second closing section 20 of the first door 15 abuts against the partitioning section 31, and thus the air that has passed through the heat exchanger for cooling 4 and the heat exchanger for heating 5 is distributed to the first passage 12. The recessed section 33 of the first door 15 is at a position separated from the first passage 12, and closes the first supply passage 22.

Meanwhile, the step portion 27 of the second door 16 faces the side vent opening 10, but does not abut against the side vent opening 10, and forms the second supply passage 29. The entry of this second supply passage 29 is formed at the position that is in the extending direction of the first supply passage 22 and where there is the slight gap between this second supply passage 29 and the first supply passage 22.

In this way, as shown by an outline arrow and solid arrows in FIG. 14(a), all the air that is delivered from the blower unit into the air passage 3 of the vehicle air-conditioning unit 1 is heated by the heat exchanger for heating 5 and turns into the hot air before being distributed to the first passage 12.

The air that has been distributed to the first passage 12 flows toward the defrost opening 8 and the side vent opening 10.

At this time, the step portion 27 faces the side vent opening 10. Thus, most of the air that has been distributed to the first passage 12 is guided to flow to the defrost opening 8, and the remaining slight volume of the air flows to the side vent opening 10.

Next, as shown in FIG. 14(b), also in the cross section in which the vehicle air-conditioning unit 1 is cut along the center vent opening 9, the first closing section 19 of the first door 15 abuts against the portion of the air-conditioning case 2 above the second passage 13, the second closing section 20 of the first door 15 abuts against the partitioning section 31, and thus the air that has passed through the heat exchanger for cooling 4 and the heat exchanger for heating 5 is distributed to the first passage 12. However, in the cross section that is cut along the center vent opening 9, the first door 15 is not provided with the recessed section 33, and thus closes the first supply passage 22.

Meanwhile, the center vent closing portion 26 of the second door 16 abuts against the center vent opening 9 and closes this opening 9.

In this way, as shown by an outline arrow and solid arrows in FIG. 14(b), all the air that is delivered from the blower unit into the air passage 3 of the vehicle air-conditioning unit 1 is heated by the heat exchanger for heating 5 and turns into the hot air before being distributed to the first passage 12.

The air that has been distributed to the first passage flows toward the defrost opening 8 and the center vent opening 9.

At this time, since the center vent opening 9 is closed, the air that has been distributed to the first passage 12 flows to the defrost opening 8.

Accordingly, in the defrost mode, it is possible to blow out the hot air from the defrost blowout port and the side vent blowout port. It is also possible to set the airflow volume from the defrost blowout port to be larger than the airflow volume from the side vent blowout port.

(Def/Foot Mode)

In the def/foot mode, the air mix door 6 closes the cold air passage 3a and fully opens the hot air passage 3b.

As shown in FIG. 15(a), in the cross section in which the vehicle air-conditioning unit 1 is cut along the side vent opening 10, the first closing section 19 of the first door 15 does not abut against the portion of the air-conditioning case 2 in front of the cold/hot air mixing space 3c but forms a flow passage, the second closing section 20 of the first door 15 does not abut against the partitioning section 31 but forms a flow passage, and thus the air that has passed through the heat exchanger for cooling 4 and the heat exchanger for heating 5 is distributed to the first passage and the second passage. The first supply passage 22 that communicates between the second passage 13 and the first passage 12 is opened by the wall surfaces 34, 35 of the recessed section 33 and the outer peripheral wall surface 32 of the first door 15 and the portion of the air-conditioning case 2 at the rear of the second passage 13.

Meanwhile, the step portion 27 of the second door 16 faces the side vent opening 10, but does not abut against the side vent opening 10, and forms the second supply passage 29. The entry of this second supply passage 29 is formed at the position that is in the extending direction of the first supply passage 22 and where there is the slight gap between this second supply passage 29 and the first supply passage 22.

In this way, as shown by an outline arrow and solid arrows in FIG. 15(a), all the air that is delivered from the blower unit into the air passage 3 of the vehicle air-conditioning unit 1 is heated by the heat exchanger for heating 5 and turns into the hot air. Then, some of the air is distributed to the first passage 12 while the other is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, the step portion 27 faces the side vent opening 10. Thus, most of the air that has been distributed to the first passage 12 is guided to flow to the defrost opening 8, and the remaining slight volume of the air flows to the side vent opening 10.

Next, as shown in FIG. 15(b), also in the cross section in which the vehicle air-conditioning unit 1 is cut along the center vent opening 9, the first closing section 19 of the first door 15 does not abut against the portion of the air-conditioning case 2 in front of the cold/hot air mixing space 3c but forms the flow passage, the second closing section 20 of the first door 15 does not abut against the partitioning section 31 but forms the flow passage, and thus the air that has passed through the heat exchanger for cooling 4 and the heat exchanger for heating 5 is distributed to the first passage 12 and the second passage 13. However, in the cross section that is cut along the center vent opening 9, the first door 15 is not provided with the recessed section 33, and thus closes the first supply passage 22.

Meanwhile, the center vent closing portion 26 of the second door 16 abuts against the center vent opening 9 and closes this opening 9.

In this way, as shown by an outline arrow and solid arrows in FIG. 15(b), all the air that is delivered from the blower unit into the air passage 3 of the vehicle air-conditioning unit 1 is heated by the heat exchanger for heating 5 and turns into the hot air. Then, some of the air is distributed to the first passage 12 while the other is distributed to the second passage 13.

The air that has been distributed to the first passage 12 flows toward the defrost opening 8 and the side vent opening 10. The air that has been distributed to the second passage 13 flows toward the foot opening 11.

At this time, since the center vent opening 9 is closed, the air that has been distributed to the first passage 12 flows to the defrost opening 8.

Accordingly, in the def/foot mode, it is possible to blow out the hot air from the defrost blowout port, the side vent blowout port, and the foot blowout port. It is also possible to set the blowout volumes such that the airflow volumes from the defrost blowout port and the foot blowout port are large and that the airflow volume from the side vent blowout port is small.

(Bi-Level Mode)

In the bi-level mode, the air mix door 6 opens the cold air passage 3a and the hot air passage 3b at the arbitrary ratio, so as to produce the air at the adjusted temperature.

As shown in FIG. 16(a), in the cross section in which the vehicle air-conditioning unit 1 is cut along the side vent opening 10, the first closing section 19 of the first door 15 does not abut against the portion of the air-conditioning case 2 in front of the cold/hot air mixing space 3c but forms the flow passage, the second closing section 20 of the first door 15 does not abut against the partitioning section 31 but forms the flow passage, and thus the air that has passed through the heat exchanger for cooling 4 or the air that has passed through the heat exchanger for cooling 4 and the heat exchanger for heating 5 is distributed to the first passage and the second passage. The first supply passage 22 that communicates between the second passage 13 and the first passage 12 is opened by the wall surfaces 34, 35 of the recessed section 33 and the outer peripheral wall surface 32 of the first door 15 and the portion of the air-conditioning case 2 at the rear of the second passage 13.

Meanwhile, the step portion 27 of the second door 16 abuts against the portion of the air-conditioning case 2 in the front side of the defrost opening 8 and closes this opening 8.

In this way, as shown by an outline arrow, solid arrows, and broken arrows in FIG. 16(a), the air that is delivered from the blower unit into the air passage 3 of the vehicle air-conditioning unit 1 is divided into the cold air that is cooled by the heat exchanger for cooling 4 and the hot air that is heated by the heat exchanger for heating 5 and merged in the cold/hot air mixing space 3c. Then, most of the cold air is distributed to the first passage 12, and most of the hot air is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, since the defrost opening 8 is closed, the air that has been distributed to the first passage 12 flows to the side vent opening 10.

Next, as shown in FIG. 16(b), also in the cross section in which the vehicle air-conditioning unit 1 is cut along the center vent opening 9, the first closing section 19 of the first door 15 does not abut against the portion of the air-conditioning case 2 in front of the cold/hot air mixing space 3c but forms the flow passage, the second closing section 20 of the first door 15 does not abut against the partitioning section 31 but forms the flow passage, and thus the air that has passed through the heat exchanger for cooling 4 or the air that has passed through the heat exchanger for cooling 4 and the heat exchanger for heating 5 is distributed to the first passage 12 and the second passage 13. However, in the cross section that is cut along the center vent opening 9, the first door 15 is not provided with the recessed section 33, and thus closes the first supply passage 22.

Meanwhile, the center vent closing portion 26 of the second door 16 abuts against the portion of the air-conditioning case 2 in the front side of the defrost opening 8 and closes this opening 8.

In this way, as shown by an outline arrow, solid arrows, and broken arrows in FIG. 16(b), the air that is delivered from the blower unit into the air passage 3 of the vehicle air-conditioning unit 1 is divided into the cold air that is cooled by the heat exchanger for cooling 4 and the hot air that is heated by the heat exchanger for heating 5 and merged in the cold/hot air mixing space 3c. Then, most of the cold air is distributed to the first passage 12, and most of the hot air is distributed to the second passage 13.

The air that has been distributed to the first passage 12 flows toward the defrost opening 8 and the center vent opening 9. The air that is distributed to the second passage 13 flows toward the foot opening 11.

At this time, since the defrost opening 8 is closed, the air that has been distributed to the first passage 12 flows to the center vent opening 9.

Accordingly, in the bi-level mode, it is possible to blow out the air from the center vent blowout port, the side vent blowout port, and the foot blowout port. Here, it is possible to blow out the air at the low temperature from the center vent blowout port and the side vent blowout port and to blow out the air at the high temperature from the foot blowout port.

(Vent Mode)

In the vent mode, the air mix door 6 fully opens the cold air passage 3a and closes the hot air passage 3b.

As shown in FIG. 17(a), in the cross section in which the vehicle air-conditioning unit 1 is cut along the side vent opening 10, the first closing section 19 of the first door 15 abuts against the portion of the air-conditioning case 2 above the second passage 13, the second closing section 20 of the first door 15 abuts against the partitioning section 31, and thus the air that has passed through the heat exchanger for cooling 4 is distributed to the first passage 12. The recessed section 33 of the first door 15 is at the position separated from the first passage 12, and closes the first supply passage 22.

Meanwhile, the step portion 27 of the second door 16 abuts against the portion of the air-conditioning case 2 in the front side of the defrost opening 8 and closes this opening 8.

In this way, as shown by an outline arrow and broken arrows in FIG. 17(a), all the air that is delivered from the blower unit into the air passage 3 of the vehicle air-conditioning unit 1 is cooled by the heat exchanger for cooling 4 and turns into the cold air before being distributed to the first passage 12.

The air that has been distributed to the first passage 12 flows toward the defrost opening 8 and the side vent opening 10.

At this time, since the defrost opening 8 is closed, the air that has been distributed to the first passage 12 flows to the side vent opening 10.

Next, as shown in FIG. 17(b), also in the cross section in which the vehicle air-conditioning unit 1 is cut along the center vent opening 9, the first closing section 19 of the first door 15 abuts against the portion of the air-conditioning case 2 above the second passage 13, the second closing section 20 of the first door 15 abuts against the partitioning section 31, and thus the air that has passed through the heat exchanger for cooling 4 is distributed to the first passage. In the cross section that is cut along the center vent opening 9, the first door 15 is not provided with the recessed section 33, and thus closes the first supply passage 22.

Meanwhile, the center vent closing portion 26 of the second door 16 abuts against the portion of the air-conditioning case 2 in the front side of the defrost opening 8 and closes this opening 8.

In this way, as shown by an outline arrow and broken arrows in FIG. 17(b), all the air that is delivered from the blower unit into the air passage 3 of the vehicle air-conditioning unit 1 is cooled by the heat exchanger for cooling 4 and turns into the cold air before being distributed to the first passage 12.

The air that has been distributed to the first passage 12 flows toward the defrost opening 8 and the center vent opening 9.

At this time, since the defrost opening 8 is closed, the air that has been distributed to the first passage 12 flows to the center vent opening 9.

Accordingly, in the vent mode, it is possible to blow out the air from the center vent blowout port and the side vent blowout port.

Example 3

FIG. 19 to FIG. 24 show Example 3 of the vehicle air-conditioning unit 1 that is used for the vehicle air-conditioning system. A description will hereinafter be made on Example 3 of the vehicle air-conditioning unit 1 by using FIG. 19 to FIG. 24. Noted that a configuration of the vehicle air-conditioning unit 1 shown in Example 3 is the same as the configuration of the vehicle air-conditioning unit 1 shown in Example 1 except for a configuration of the second door 16 and a configuration of an upstream side portion of the center vent opening 9. Thus, the same components as those of the vehicle air-conditioning unit 1 shown in Example 1 are denoted by the same reference signs, and the description thereof will not be made. A description will hereinafter be made only on the configurations of the second door 16 and the upstream side portion of the center vent opening 9.

Figure 19:
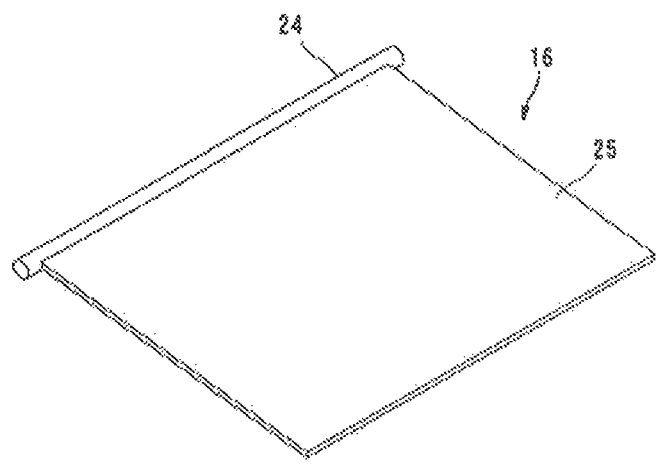
FIG. 19 is a perspective view of a configuration of the second door in the air-conditioning unit shown in FIG. 1, the second door including the fourth closing section that does not have the step portion.
Figure 20:
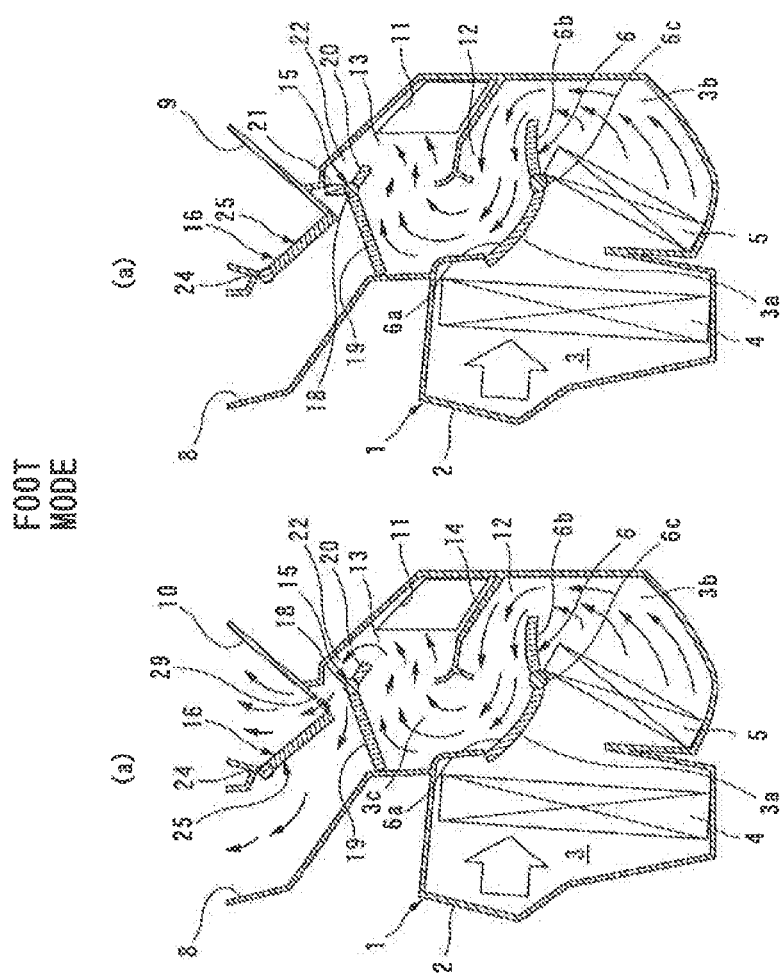
FIG. 20 schematically shows a state of the air-conditioning unit shown in FIG. 1 in the foot mode, the air-conditioning unit having a configuration that uses the first door as the butterfly-type door in FIG. 2 and the second door as a cantilever-type door in FIG. 19 and in which the side vent opening is arranged further on a downstream side of the center vent opening arranged on a downstream side of a heat exchanger. Furthermore.
Figure 21:
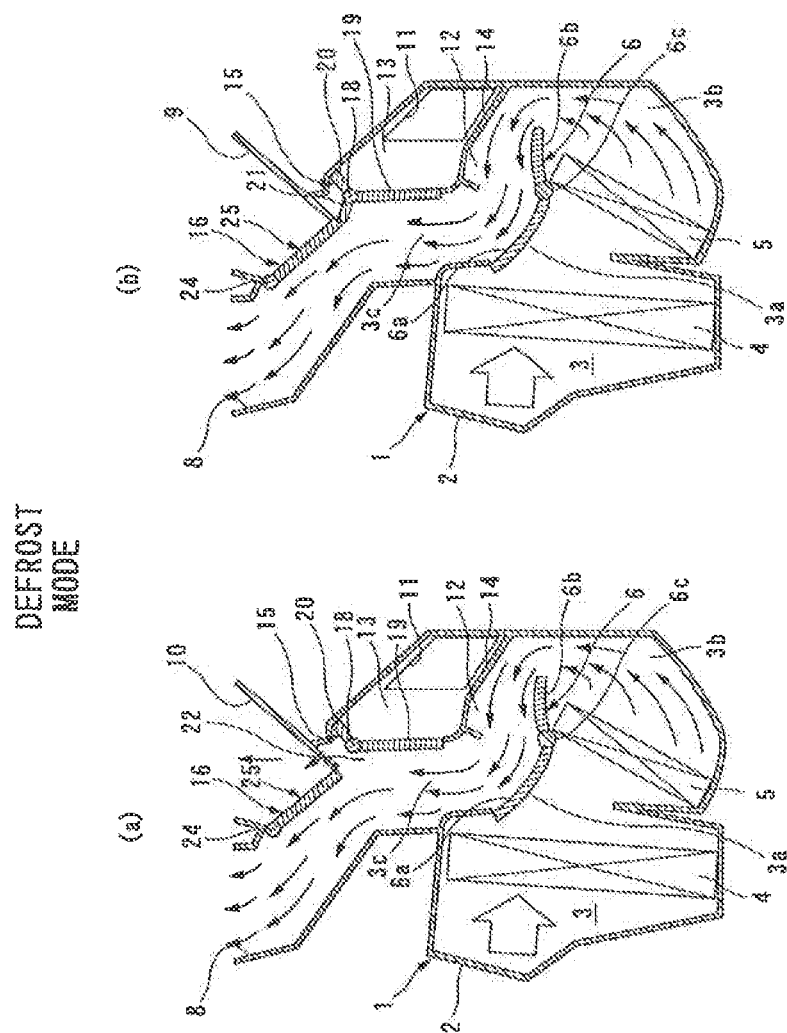
FIG. 21 schematically shows a state of the air-conditioning unit shown in FIG. 1 in the defrost mode, the air-conditioning unit having the configuration that uses the first door as the butterfly-type door in FIG. 2 and the second door as the cantilever-type door in FIG. 19 and in which the side vent opening is arranged further on the downstream side of the center vent opening arranged on the downstream side of the heat exchanger. Furthermore.
Figure 22:
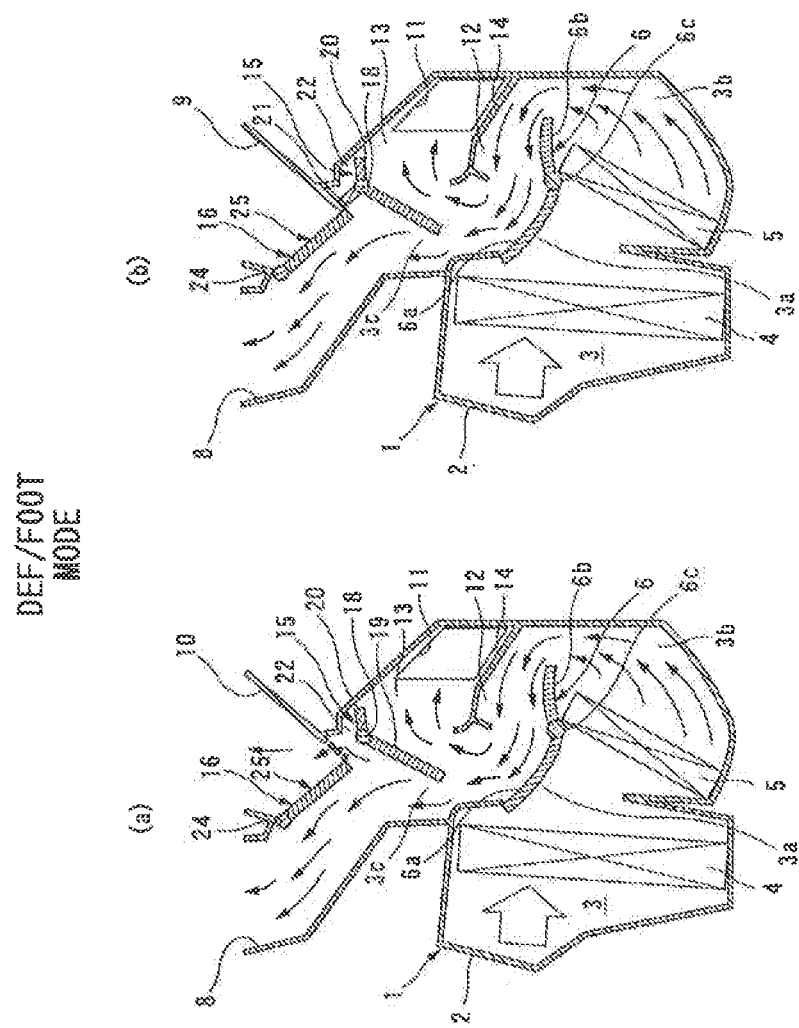
FIG. 22 schematically shows a state of the air-conditioning unit shown in FIG. 1 in the def/foot mode, the air-conditioning unit having the configuration that uses the first door as the butterfly-type door in FIG. 2 and the second door as the cantilever-type door in FIG. 19 and in which the side vent opening is arranged further on the downstream side of the center vent opening arranged on the downstream side of the heat exchanger. Furthermore.

Of the configurations, as shown in FIG. 19, the second door 16 is configured by including: the rotational shaft 24 that is supported by the air-conditioning case 2; and the fourth closing section 25 that extends in the radial direction of the rotational shaft 24 from this rotational shaft 24, and is the same as the second door 16 shown in Example 1 in this point. Meanwhile, the fourth closing section 25 differs from that of the second door 16 shown in FIG. 3 and FIG. 10, does not have a step portion, and has an evenly flat plate shape.

The opening end on the upstream side (the second door 16 side) of the center vent opening 9 is arranged at a position that is projected to the heat exchanger for heating 5 side when compared to the opening end on the upstream side (the second door 16 side) of the side vent opening 10.

In conjunction with this, when the second door 16 abuts against the opening end on the upstream side of the center vent opening 9, the second door 16 does not abut against the opening end on the upstream side of the side vent opening 10, and thus the second supply passage 29 is formed between the second door 16 and the opening end on the upstream side of the side vent opening 10.

Based on the above configuration of the vehicle air-conditioning unit 1, the airflow in the air-conditioning case 2 in each of the foot mode, the defrost mode, the def/foot mode, the bi-level mode, and the vent mode will be described in the cross section that is cut along the side vent opening 10 and the cross section that is cut along the center vent opening 9 by using FIG. 20 to FIG. 24.

(Foot Mode)

In the foot mode, the air mix door 6 closes the cold air passage 3a and fully opens the hot air passage 3b.

As shown in FIG. 20(a), in the cross section in which the vehicle air-conditioning unit 1 is cut along the side vent opening 10, the first closing section 19 of the first door 15 abuts against the portion of the air-conditioning case 2 in front of the cold/hot air mixing space 3c, and distributes the air that has passed through the heat exchanger for cooling 4 and the heat exchanger for heating 5 to the second passage. The second closing section 20 of the first door 15 does not abut against the portion of the air-conditioning case 2 at the rear of the second passage 13, and opens the first supply passage 22 that communicates between the second passage 13 and the first passage 12.

Meanwhile, the fourth closing section 25 of the second door 16 faces the side vent opening 10, but does not abut against the side vent opening 10, and forms the second supply passage 29 between the fourth closing section 25 and the opening end on the upstream side of the side vent opening 10. The entry of this second supply passage 29 is formed at the position that is in the extending direction of the first supply passage 22 and where there is the slight gap between this second supply passage 29 and the first supply passage 22.

In this way, as shown by an outline arrow and solid arrows in FIG. 20(a), all the air that is delivered from the blower unit into the air passage 3 of the vehicle air-conditioning unit 1 is heated by the heat exchanger for heating 5 and turns into the hot air before being distributed to the second passage 13.

The air that has been distributed to the second passage 13 flows toward the foot opening 11 while some of the air flows along the extending direction of the first supply passage 22 and is blown out to the first passage 12.

While most of the air that has been blown out to the first passage 12 flows to the side vent opening 10 through the second supply passage 29, the remaining slight volume of the air flows to the defrost opening 8.

Next, as shown in FIG. 20(b), also in the cross section in which the vehicle air-conditioning unit 1 is cut along the center vent opening 9, the first closing section 19 of the first door 15 abuts against the portion of the air-conditioning case 2 in front of the cold/hot air mixing space 3c, and distributes the air that has passed through the heat exchanger for cooling 4 and the heat exchanger for heating 5 to the second passage 13. However, the third closing section 21 of the first door 15 abuts against the portion of the air-conditioning case 2 above the second passage 13, and closes the first supply passage 22.

Meanwhile, the fourth closing section 25 of the second door 16 abuts against the center vent opening 9 and closes this opening 9.

In this way, as shown by an outline arrow and solid arrows in FIG. 20(b), all the air that is delivered from the blower unit into the air passage 3 of the vehicle air-conditioning unit 1 is heated by the heat exchanger for heating 5 and turns into the hot air before being distributed to the second passage 13.

Since the first supply passage 22 is closed, the air that has been distributed to the second passage 13 flows toward the foot opening 11.

Accordingly, in the foot mode, it is possible to blow out the hot air from the defrost blowout port, the side vent blowout port, and the foot blowout port. It is also possible to set the blowout volumes such that the airflow volume from the foot blowout port is the largest, followed by that from the side vent blowout port and that from the defrost blowout port in this order.

(Defrost Mode)

In the defrost mode, the air mix door 6 closes the cold air passage 3a and fully opens the hot air passage 3b.

As shown in FIG. 21(a), in the cross section in which the vehicle air-conditioning unit 1 is cut along the side vent opening 10, the first closing section 19 of the first door 15 abuts against the partitioning section 14, and distributes the air that has passed through the heat exchanger for cooling 4 and the heat exchanger for heating 5 to the first passage 12. The second closing section 20 of the first door 15 abuts against the portion of the air-conditioning case 2 above the second passage 13, and closes the first supply passage 22.

Meanwhile, the fourth closing section 25 of the second door 16 faces the side vent opening 10, but does not abut against the side vent opening 10, and forms the second supply passage 29 between the fourth closing section 25 and the opening end on the upstream side of the side vent opening 10. The entry of this second supply passage 29 is formed at the position that is in the extending direction of the first supply passage 22 and where there is the slight gap between this second supply passage 29 and the first supply passage 22.

In this way, as shown by an outline arrow and solid arrows in FIG. 21(a), all the air that is delivered from the blower unit into the air passage 3 of the vehicle air-conditioning unit 1 is heated by the heat exchanger for heating 5 and turns into the hot air before being distributed to the first passage 12.

The air that has been distributed to the first passage 12 flows toward the defrost opening 8 and the side vent opening 10.

At this time, the fourth closing section 25 faces the side vent opening 10. Thus, while most of the air that has been distributed to the first passage 12 is guided to flow to the defrost opening 8, the remaining slight volume of the air flows to the side vent opening 10.

Next, as shown in FIG. 21(b), also in the cross section in which the vehicle air-conditioning unit 1 is cut along the center vent opening 9, the first closing section 19 of the first door 15 abuts against the partitioning section 14, and distributes the air that has passed through the heat exchanger for cooling 4 and the heat exchanger for heating 5 to the first passage 12. The second closing section 20 of the first door 15 abuts against the portion of the air-conditioning case 2 above the second passage 13, and closes the first supply passage 22. The third closing section 21 of the first door 15 does not abut against the air-conditioning case 2.

Meanwhile, the fourth closing section 25 of the second door 16 abuts against the center vent opening 9 and closes this opening 9.

In this way, as shown by an outline arrow and solid arrows in FIG. 21(b), all the air that is delivered from the blower unit into the air passage 3 of the vehicle air-conditioning unit 1 is heated by the heat exchanger for heating 5 and turns into the hot air before being distributed to the first passage 12.

The air that has been distributed to the first passage 12 flows toward the defrost opening 8 and the center vent opening 9.

At this time, since the center vent opening 9 is closed, the air that has been distributed to the first passage 12 flows to the defrost opening 8.

Accordingly, in the defrost mode, it is possible to blow out the hot air from the defrost blowout port and the side vent blowout port. It is also possible to set the airflow volume from the defrost blowout port to be larger than the airflow volume from the side vent blowout port.

(Def/Foot Mode)

In the def/foot mode, the air mix door 6 closes the cold air passage 3a and fully opens the hot air passage 3b.

As shown in FIG. 22(a), in the cross section in which the vehicle air-conditioning unit 1 is cut along the side vent opening 10, the first closing section 19 of the first door 15 is positioned in the middle between the portion of the air-conditioning case 2 in front of the cold/hot air mixing space 3c and the partitioning section 14, and distributes the air that has passed through the heat exchanger for cooling 4 and the heat exchanger for heating 5 to the first passage 12 and the second passage 13. The second closing section 20 of the first door 15 does not abut against the portion of the air-conditioning case 2 at the rear of the second passage 13, and opens the first supply passage 22 that communicates between the second passage 13 and the first passage 12.

Meanwhile, the fourth closing section 25 of the second door 16 faces the side vent opening 10, but does not abut against the side vent opening 10, and forms the second supply passage 29 between the fourth closing section 25 and the opening end on the upstream side of the side vent opening 10. The entry of this second supply passage 29 is formed at the position that is in the extending direction of the first supply passage 22 and where there is the slight gap between this second supply passage 29 and the first supply passage 22.

In this way, as shown by an outline arrow and solid arrows in FIG. 22(a), all the air that is delivered from the blower unit into the air passage 3 of the vehicle air-conditioning unit 1 is heated by the heat exchanger for heating 5 and turns into the hot air. Then, some of the air is distributed to the first passage 12 while the other is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, the fourth closing section 25 faces the side vent opening 10. Thus, while most of the air that has been distributed to the first passage 12 is guided to flow to the defrost opening 8, the remaining slight volume of the air flows to the side vent opening 10.

Next, as shown in FIG. 22(b), also in the cross section in which the vehicle air-conditioning unit 1 is cut along the center vent opening 9, the first closing section 19 of the first door 15 is positioned in the middle between the portion of the air-conditioning case 2 in front of the cold/hot air mixing space 3c and the partitioning section 14, and distributes the air that has passed through the heat exchanger for cooling 4 and the heat exchanger for heating 5 to the first passage 12 and the second passage 13. The second closing section 20 of the first door 15 does not abut against the portion of the air-conditioning case 2 at the rear of the second passage 13, and opens the first supply passage 22 that communicates between the second passage 13 and the first passage 12. The third closing section 21 of the first door 15 does not abut against the air-conditioning case 2.

Meanwhile, the fourth closing section 25 of the second door 16 abuts against the center vent opening 9 and closes this opening 9.

In this way, as shown by an outline arrow and solid arrows in FIG. 22(b), all the air that is delivered from the blower unit into the air passage 3 of the vehicle air-conditioning unit 1 is heated by the heat exchanger for heating 5 and turns into the hot air. Then, some of the air is distributed to the first passage 12 while the other is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, since the center vent opening 9 is closed, the air that has been distributed to the first passage 12 flows to the defrost opening 8.

Accordingly, in the def/foot mode, it is possible to blow out the hot air from the defrost blowout port, the side vent blowout port, and the foot blowout port. It is also possible to set the blowout volumes such that the airflow volumes from the defrost blowout port and the foot blowout port are large and that the airflow volume from the side vent blowout port is small.

(Bi-Level Mode)

In the bi-level mode, the air mix door 6 opens the cold air passage 3a and the hot air passage 3b at the arbitrary ratio, so as to produce the air at the adjusted temperature.

Figure 23:
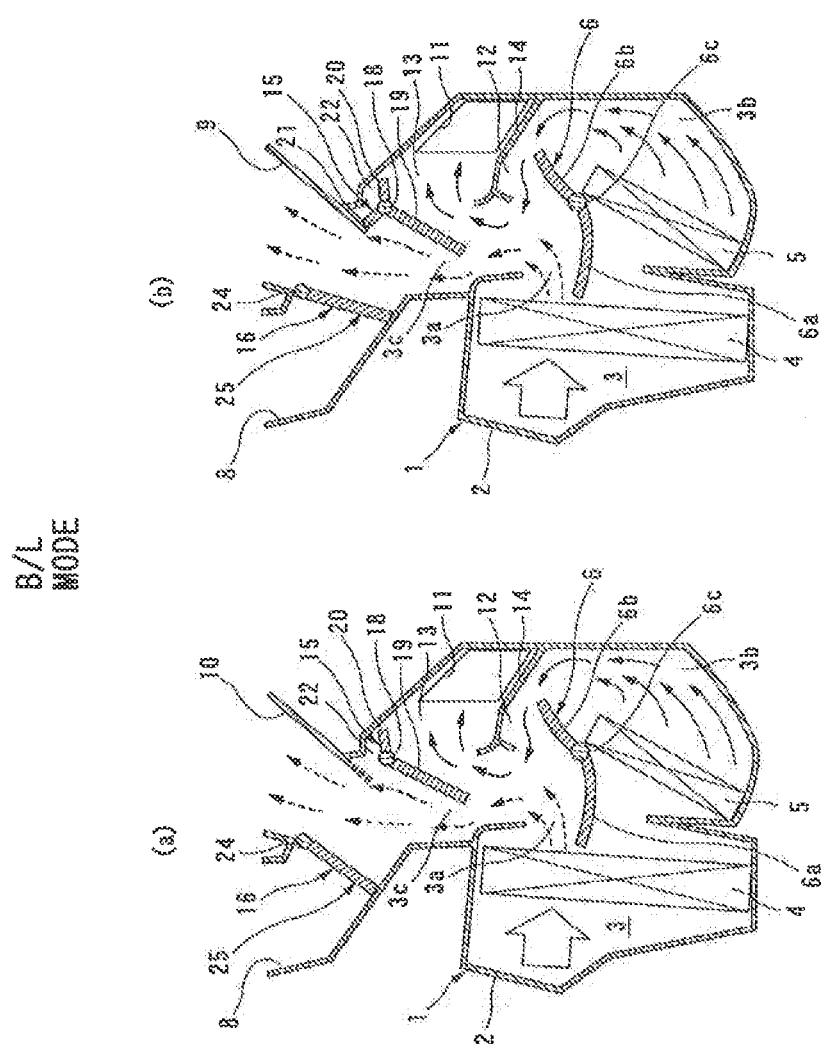
FIG. 23 schematically shows a state of the air-conditioning unit shown in FIG. 1 in the bi-level mode, the air-conditioning unit having the configuration that uses the first door as the butterfly-type door in FIG. 2 and the second door as the cantilever-type door in FIG. 19 and in which the side vent opening is arranged further on the downstream side of the center vent opening arranged on the downstream side of the heat exchanger. Furthermore.

As shown in FIG. 23(*a*), in the cross section in which the vehicle air-conditioning unit 1 is cut along the side vent opening 10, the first closing section 19 of the first door 15 is positioned in the middle between the portion of the air-conditioning case 2 in front of the cold/hot air mixing space 3*c* and the partitioning section 14, and distributes the air that has passed through the heat exchanger for cooling 4 or the air that has passed through the heat exchanger for cooling 4 and the heat exchanger for heating 5 to the first passage 12 and the second passage 13. The second closing section 20 of the first door 15 does not abut against the portion of the air-conditioning case 2 at the rear of the second passage 13, and opens the first supply passage 22 that communicates between the second passage 13 and the first passage 12.

Meanwhile, the fourth closing section 25 of the second door 16 abuts against the portion of the air-conditioning case 2 in the front side of the defrost opening 8 and closes this opening 8.

In this way, as shown by an outline arrow, solid arrows, and broken arrows in FIG. 23(*a*), the air that is delivered from the blower unit into the air passage 3 of the vehicle air-conditioning unit 1 is divided into the cold air that is cooled by the heat exchanger for cooling 4 and the hot air that is heated by the heat exchanger for heating 5 and merged in the cold/hot air mixing space 3*c*. Then, most of the cold air is distributed to the first passage 12, and most of the hot air is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, since the defrost opening 8 is closed, the air that has been distributed to the first passage 12 flows to the side vent opening 10.

Next, as shown in FIG. 23(*b*), also in the case where the vehicle air-conditioning unit 1 is cut along the center vent opening 9, the first closing section 19 of the first door 15 is positioned in the middle between the portion of the air-conditioning case 2 in front of the cold/hot air mixing space 3*c* and the partitioning section 14, and distributes the air that has passed through the heat exchanger for cooling 4 or the air that has passed through the heat exchanger for cooling 4 and the heat exchanger for heating 5 to the first passage 12 and the second passage 13. The second closing section 20 of the first door 15 does not abut against the portion of the air-conditioning case 2 at the rear of the second passage 13, and opens the first supply passage 22 that communicates between the second passage 13 and the first passage 12. The third closing section 21 of the first door 15 does not abut against the air-conditioning case 2.

Meanwhile, the fourth closing section 25 of the second door 16 abuts against the portion of the air-conditioning case 2 in the front side of the defrost opening 8 and closes this opening 8.

In this way, as shown by an outline arrow, solid arrows, and broken arrows in FIG. 23(*b*), the air that is delivered from the blower unit into the air passage 3 of the vehicle air-conditioning unit 1 is divided into the cold air that is cooled by the heat exchanger for cooling 4 and the hot air that is heated by the heat exchanger for heating 5 and merged in the cold/hot air mixing space 3*c*. Then, most of the cold air is distributed to the first passage 12, and most of the hot air is distributed to the second passage 13.

While the air that has been distributed to the first passage 12 flows toward the defrost opening 8 and the side vent opening 10, some of the air can flow toward the second passage 13 along the extending direction of the first supply passage 22. While the air that has been distributed to the second passage 13 flows toward the foot opening 11, some of the air can flow toward the first passage 12 along the extending direction of the first supply passage 22.

At this time, since the defrost opening 8 is closed, the air that has been distributed to the first passage flows to the center vent opening 9.

Accordingly, in the bi-level mode, it is possible to blow out the air from the center vent blowout port, the side vent blowout port, and the foot blowout port. Here, it is also possible to blow out the air at the low temperature from the center vent blowout port and the side vent blowout port and to blow out the air at the high temperature from the foot blowout port.

(Vent Mode)

In the vent mode, the air mix door 6 fully opens the cold air passage 3*a* and closes the hot air passage 3*b*.

Figure 24:
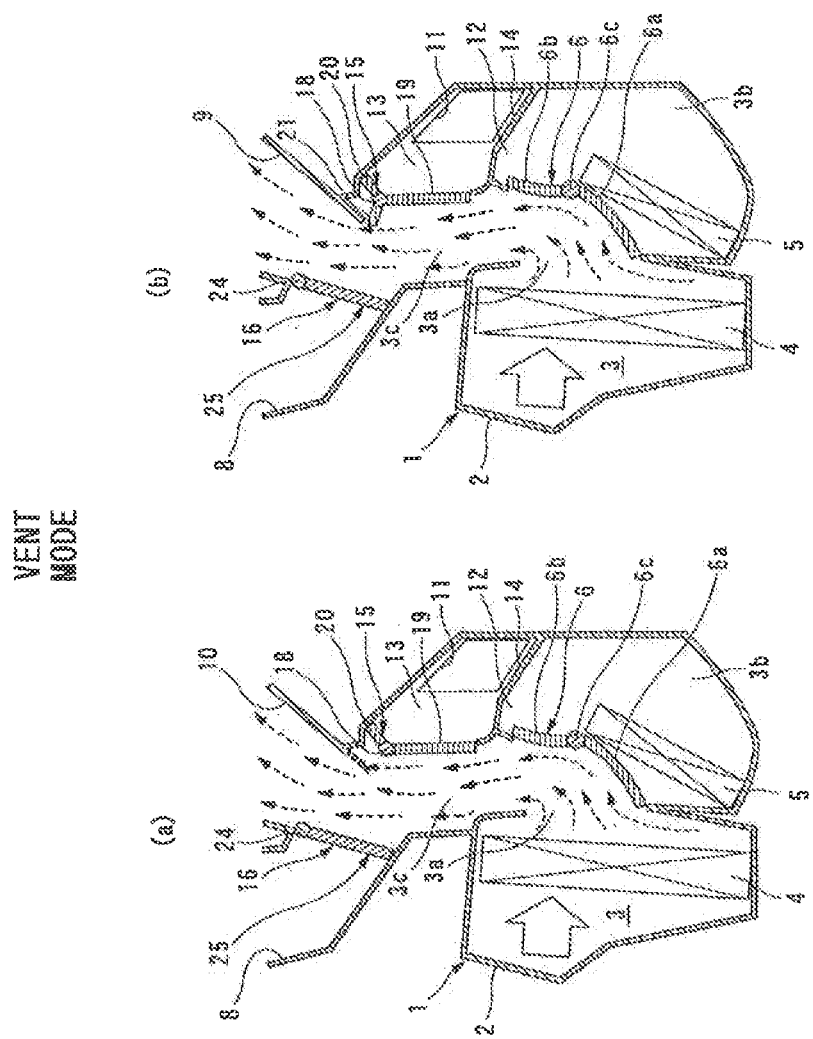
FIG. 24 schematically shows a state of the air-conditioning unit shown in FIG. 1 in the vent mode, the air-conditioning unit having the configuration that uses the first door as the butterfly-type door in FIG. 2 and the second door as the cantilever-type door in FIG. 19 and in which the side vent opening is arranged further on the downstream side of the center vent opening arranged on the downstream side of the heat exchanger. Furthermore.

As shown in FIG. 24(*a*), in the cross section in which the vehicle air-conditioning unit 1 is cut along the side vent opening 10, the first closing section 19 of the first door 15 abuts against the partitioning section 14, and distributes the air that has passed through the heat exchanger for cooling 4 to the first passage 12. The second closing section 20 of the first door 15 abuts against the portion of the air-conditioning case 2 above the second passage 13, and closes the first supply passage 22. The third closing section 21 of the first door 15 does not abut against the air-conditioning case 2.

Meanwhile, the fourth closing section 25 of the second door 16 abuts against the portion of the air-conditioning case 2 in the front side of the defrost opening 8 and closes this opening 8.

Accordingly, as shown by an outline arrow and broken arrows in FIG. 24(*a*), all the air that is delivered from the blower unit into the air passage 3 of the vehicle air-conditioning unit 1 is cooled by the heat exchanger for cooling 4 and turns into the cold air before being distributed to the first passage 12.

The air that has been distributed to the first passage 12 flows toward the defrost opening 8 and the side vent opening 10.

At this time, since the defrost opening 8 is closed, the air that has been distributed to the first passage 12 flows to the side vent opening 10.

Next, as shown in FIG. 24(*b*), also in the cross section in which the vehicle air-conditioning unit 1 is cut along the center vent opening 9, the first closing section 19 of the first door 15 abuts against the partitioning section 14, and distributes the air that has passed through the heat exchanger for cooling 4 to the first passage 12. The second closing section 20 of the first door 15 abuts against the portion of the air-conditioning case 2 above the second passage 13, and closes the first supply passage 22. The third closing section 21 of the first door 15 does not abut against the air-conditioning case 2.

Meanwhile, the fourth closing section 25 of the second door 16 abuts against the portion of the air-conditioning case 2 in the front side of the defrost opening 8 and closes this opening 8.

Accordingly, as shown by an outline arrow and broken arrows in FIG. 24(*b*), all the air that is delivered from the blower unit into the air passage 3 of the vehicle air-conditioning unit 1 is cooled by the heat exchanger for cooling 4 and turns into the cold air before being distributed to the first passage 12.

The air that has been distributed to the first passage 12 flows toward the defrost opening 8 and the center vent opening 9.

At this time, since the defrost opening 8 is closed, the air that has been distributed to the first passage 12 flows to the center vent opening 9.

Accordingly, in the vent mode, it is possible to blow out the air from the center vent blowout port and the side vent blowout port.

Then, also in this Example 3, in the cross section in which the vehicle air-conditioning unit 1 is cut along the side vent opening 10 with respect to the air-conditioning case 2, the first supply passage 22 may be configured as the tunnel 30, which is shown in FIG. 10, in the foot mode.

Accordingly, also in Example 3, most of the hot air that has flown into the first supply passage 22, that is, the tunnel 30 flows through the tunnel 30, and is reliably delivered to the second supply passage 29. Thus, the volume of the airflow that is delivered to the defrost opening 8 can relatively be reduced. Therefore, the volume of the air that is blown out of the side vent blowout port through the side vent opening 10 can also reliably be increased to be larger than the volume of the air that is blown out of the defrost blowout port through the defrost opening 8.

REFERENCE SIGNS LIST

1: vehicle air-conditioning unit
2: air-conditioning case
3: air passage
4: heat exchanger for cooling
5: heat exchanger for heating
8: defrost opening
9: center vent opening
10: side vent opening
11: foot opening
12: first passage
13: second passage
15: first door
16: second door
18: rotational shaft of first door
19: first closing section of first door
20: second closing section of first door
21: third closing section of first door
22: first supply passage
23: tunnel closing section
24: rotational shaft of second door
25: fourth closing section of second door
26: center vent closing portion of second door
27: step portion of second door
29: second supply passage
30: tunnel
32: outer peripheral wall surface of first door
33: recessed section of first door

The invention claimed is:

1. A vehicle conditioning unit including:
an air-conditioning case that has an air passage;
a heat exchanger that is arranged in the air passage and exchanges heat with air flowing through the air passage;
a center vent opening that is provided on a downstream side of the heat exchanger arranged in the air-conditioning case;
a side vent opening that is provided on a right side and/or a left side in a vehicle right and left direction of the center vent opening;
a defrost opening that is provided in a front side in a vehicle longitudinal direction of the center vent opening; and
a foot opening that is provided on a lower side in a vehicle vertical direction of the center vent opening,
wherein the air passage has:
a first passage that guides air that has passed through the heat exchanger to the center vent opening, the side vent opening, and the defrost opening; and
a second passage that is branched from the first passage and guides the air that has passed through the heat exchanger to the foot opening,
wherein a first door for distributing the air that has passed through the heat exchanger to the first passage and the second passage is arranged at a branched position to the second passage,
wherein a first supply passage that communicates between the first passage and the second passage is provided on a downstream side of the first door, and this first supply passage is opened and closed by the first door, and
wherein a second door for distributing the air that has passed through the heat exchanger to the center vent opening and the defrost opening is arranged in the first passage at a position on a downstream side of the first supply passage,
wherein in the vehicle air-conditioning unit in a foot mode, the first door closes the first passage and opens the first supply passage, and the second door closes the center vent opening, and forms a second supply passage, an entry of which is positioned in an extending direction of the first supply passage and an exit of which communicates with the side vent openings,
wherein the first door is a butterfly-type door that has:
a rotational shaft that is rotatably supported by the air-conditioning case;
a first closing section that extends from the rotational shaft;
a second closing section that extends from the rotational shaft in a different direction from the first closing section and greater than 90 degrees from the direction of the first closing section, in the foot mode, the first closing section closes the first passage, and the second closing section opens the first supply passage, and
a third closing section that extends from the rotational shaft in a different direction from both of the first closing section and the second closing section, a length of the third closing section in a direction along a shaft direction of the rotational shaft is shorter than a length of the first supply passage in the direction along the shaft direction of the rotational shaft, and in the foot mode, the third closing section partially closes the first supply passage.

2. The vehicle air-conditioning unit according to claim 1 wherein the heat exchanger heats the air in the air passage.

3. The vehicle air-conditioning unit according to claim 1 wherein the first supply passage is in a tunnel shape.

4. The vehicle air-conditioning unit according to claim 1 wherein the second door has:
a rotational shaft that is rotatably supported by the air-conditioning case; and
a fourth closing section that extends from the rotational shaft, the fourth closing section includes:
a center vent closing portion that can close the center vent opening; and
a step portion that has a step displaced in a peripheral direction of the rotational shaft with respect to the center vent closing portion, in the foot mode, the center vent closing portion closes the center vent opening, and the step portion is positioned on an upstream side of the side vent opening and forms the second supply passage.

5. The vehicle air-conditioning unit according to claim 1 wherein in a defrost mode or a vent mode, the first door closes the second passage and also closes the first supply passage.

6. The vehicle air-conditioning unit according to claim 1 wherein the first door is the butterfly-type door, in a defrost mode or a vent mode, the first closing section closes the second passage, and the second closing section closes the first supply passage.

7. The vehicle air-conditioning unit according to claim 1 wherein the second door has:
a rotational shaft that is rotatably supported by the air-conditioning case; and
a fourth closing section that extends from the rotational shaft, the side vent opening is arranged further on a downstream side of the center vent opening arranged on the downstream side of the heat exchanger, and in the foot mode, the fourth closing section closes the center vent opening, is arranged on the upstream side of the side vent opening, and forms the second supply passage.

8. A vehicle conditioning unit including:
an air-conditioning case that has an air passage;
a heat exchanger that is arranged in the air passage and exchanges heat with air flowing through the air passage;
a center vent opening that is provided on a downstream side of the heat exchanger arranged in the air-conditioning case;
a side vent opening that is provided on a right side and/or a left side in a vehicle right and left direction of the center vent opening;
a defrost opening that is provided in a front side in a vehicle longitudinal direction of the center vent opening; and
a foot opening that is provided on a lower side in a vehicle vertical direction of the center vent opening,
wherein the air passage has:
a first passage that guides air that has passed through the heat exchanger to the center vent opening, the side vent opening, and the defrost opening; and
a second passage that is branched from the first passage and guides the air that has passed through the heat exchanger to the foot opening,
wherein a first door for distributing the air that has passed through the heat exchanger to the first passage and the second passage is arranged at a branched position to the second passage,
wherein a first supply passage that communicates between the first passage and the second passage is provided on a downstream side of the first door, and this first supply passage is opened and closed by the first door, and
wherein a second door for distributing the air that has passed through the heat exchanger to the center vent opening and the defrost opening is arranged in the first passage at a position on a downstream side of the first supply passage,
wherein in the vehicle air-conditioning unit in a foot mode, the first door closes the first passage and opens the first supply passage, and the second door closes the center vent opening, and forms a second supply passage, an entry of which is positioned in an extending direction of the first supply passage and an exit of which communicates with the side vent opening,
The vehicle air conditioning unit according to claim 1 wherein the first door is a butterfly-type door that has:
a rotational shaft that is rotatably supported by the air-conditioning case; a first closing section that extends from the rotational shaft; and
a second closing section that extends from the rotational shaft in a different direction from the first closing section and greater than 90 degrees from the direction of the first closing section, in the foot mode, the first closing section closes the first passage, and the second closing section opens the first supply passage.

9. The vehicle air-conditioning unit according to claim 8 wherein the second door has:
a rotational shaft that is rotatably supported by the air-conditioning case; and
a fourth closing section that extends from the rotational shaft,
the fourth closing section includes:
a center vent closing portion that can close the center vent opening; and
a step portion that has a step displaced in a peripheral direction of the rotational shaft with respect to the center vent closing portion, in the foot mode, the center vent closing portion closes the center vent opening, and the step portion is positioned on an upstream side of the side vent opening and forms the second supply passage.

10. The vehicle air-conditioning unit according to claim 9 wherein the second door has the fourth closing section including the center vent closing portion and the step portion in a defrost mode or a def/foot mode, the center vent closing portion closes the center vent opening, the step portion is arranged on the upstream side of the side vent opening and forms the second supply passage, and in a vent mode or a bi-level mode, the fourth closing section closes the defrost opening.

11. The vehicle air-conditioning unit according to claim 8 wherein the second door has:
a rotational shaft that is rotatably supported by the air-conditioning case; and
a fourth closing section that extends from the rotational shaft, the side vent opening is arranged further on a downstream side of the center vent opening arranged on the downstream side of the heat exchanger, and in the foot mode, the fourth closing section closes the center vent opening, is arranged on the upstream side of the side vent opening, and forms the second supply passage.

12. The vehicle air-conditioning unit according to claim 11 wherein the second door has the fourth closing section, the side vent opening is arranged further on a downstream side of the center vent opening arranged on the downstream side of the heat exchanger, in a defrost mode or a def/foot mode, the fourth closing section closes the center vent opening and is positioned on the upstream side of the side vent opening, and forms the second supply passage, and in a vent mode or a bi-level mode, the fourth closing section closes the defrost opening.

13. The vehicle air-conditioning unit according to claim 8 wherein in a defrost mode or a vent mode, the first door closes the second passage and also closes the first supply passage.

14. The vehicle air-conditioning unit according to claim 8 wherein the first door is the butterfly-type door, in a defrost mode or a vent mode, the first closing section closes the second passage, and the second closing section closes the first supply passage.

* * * * *